(12) United States Patent
Levy

(10) Patent No.: US 10,464,820 B2
(45) Date of Patent: Nov. 5, 2019

(54) FLUID PURIFICATION MEDIA AND CARTRIDGE

(71) Applicant: Selecto, Inc., Suwanee, GA (US)

(72) Inventor: Ehud Levy, Suwanee, GA (US)

(73) Assignee: SELECTO INCORPORATED, Suwanee, GA (US)

( * ) Notice: Subject to any disclaimer, the term of this patent is extended or adjusted under 35 U.S.C. 154(b) by 277 days.

(21) Appl. No.: 13/669,673

(22) Filed: Nov. 6, 2012

(65) Prior Publication Data

US 2013/0118997 A1    May 16, 2013

Related U.S. Application Data

(60) Provisional application No. 61/556,595, filed on Nov. 7, 2011.

(51) Int. Cl.
| | |
|---|---|
| *C05F 1/00* | (2006.01) |
| *C02F 1/72* | (2006.01) |
| *C02F 5/00* | (2006.01) |
| *C02F 1/00* | (2006.01) |
| *B01D 39/20* | (2006.01) |
| *C02F 1/28* | (2006.01) |
| *C02F 101/12* | (2006.01) |

(52) U.S. Cl.
CPC ............ *C02F 1/00* (2013.01); *B01D 39/2062* (2013.01); *C02F 1/001* (2013.01); *C02F 1/281* (2013.01); *C02F 1/283* (2013.01); *C02F 1/288* (2013.01); *C02F 1/72* (2013.01); *C02F 5/00* (2013.01); *C02F 2101/12* (2013.01); *C02F 2201/003* (2013.01); *C02F 2201/006* (2013.01); *C02F 2303/22* (2013.01); *C02F 2307/12* (2013.01)

(58) Field of Classification Search
None
See application file for complete search history.

(56) References Cited

U.S. PATENT DOCUMENTS

| | | |
|---|---|---|
| 4,753,727 A | 6/1988 | Vanderbilt |
| 4,753,728 A | 6/1988 | Vanderbilt |
| 4,882,056 A * | 11/1989 | Degen .................. B01D 24/001 |
| | | 210/490 |

(Continued)

OTHER PUBLICATIONS

Observatorioplastico.com, "New GUR® X 192 Macropowder from Ticona Expands Porous Plastic Design Possibilities for Filtration". [online]. Observatorio del Plastico, Earliest known availability date shown by Observatorio del Plastico: Oct. 25, 2010 [retrieved on Jan. 8, 2015]. <http://www.observatorioplastico.com/detalle_noticia.php?no_id=14>.*
Machine translation of JP 62-142629 A, also known as JP 7-38929 B. Katsube, Toraichi, 1987.*
"1 Micron Water Filters", <http://salewaterfilter.net/1-micron-water-filters.html>, Water Filter, Obtained from Web, Aug. 30, 2016, 6 total pages.*

(Continued)

*Primary Examiner* — Johnathan M Peo
(74) *Attorney, Agent, or Firm* — Dickinson Wright PLLC

(57) ABSTRACT

A fluid purification system, comprising a first fluid purification media comprising a first rigid porous purification block, comprising a longitudinal first surface; a longitudinal second surface disposed inside the longitudinal first surface; and a porous high density polymer disposed between the longitudinal first surface and the longitudinal second surface; a second fluid purification media, comprising a fluid purification material comprising a particulate oxidizing material disposed adjacent to the first surface of the first fluid purification media, the second surface of the first purification media, or both.

45 Claims, 14 Drawing Sheets

(56) References Cited

U.S. PATENT DOCUMENTS

| | | | |
|---|---|---|---|
| 5,017,318 A * | 5/1991 | Vanderbilt et al. | 264/113 |
| 5,169,528 A * | 12/1992 | Karbachsch | B01D 24/008 |
| | | | 210/264 |
| 5,609,759 A | 3/1997 | Nohren, Jr. | |
| 6,165,362 A | 12/2000 | Nohren, Jr. | |
| 6,241,893 B1 * | 6/2001 | Levy | 210/660 |
| 6,524,477 B1 * | 2/2003 | Hughes | 210/282 |
| 6,662,956 B2 * | 12/2003 | Levy | 210/501 |
| 7,754,123 B2 * | 7/2010 | Verdegan et al. | 264/122 |
| 2004/0129617 A1 * | 7/2004 | Tanner et al. | 210/110 |
| 2004/0195180 A1 * | 10/2004 | Cumberland et al. | 210/660 |
| 2004/0206682 A1 * | 10/2004 | Hamlin et al. | 210/321.6 |
| 2006/0000763 A1 * | 1/2006 | Rinker et al. | 210/282 |
| 2006/0207925 A1 * | 9/2006 | Levy | 210/282 |
| 2011/0062066 A1 | 3/2011 | Mccague | |

OTHER PUBLICATIONS

"What is the Micron Rating of the Black Berkey purification elements", <http://www.berkeywaterfilter.com/faq/what-is-the-micron-rating-of-the-black-berkey-purification-elements/>, Berkey Water Filter, Obtained from Web, Aug. 30, 2016, 4 total pages.*

"Physical properties of soils", <http://www.tankonyvtar.hu/hu/tartalom/tamop425/0033_SCORM_MFKHT6504SI-EN/sco_01_01.scorm>, Obtained from Web, Aug. 30, 2016, 10 total pages.*

Sigma Aldrich, "Particle Size Conversion Table", Obtained from Web, Feb. 15, 2017, <http://www.sigmaaldrich.com/chemistry/stockroom-reagents/learning-center/technical-library/particle-size-conversion.html>, 2 total pages.*

International Search Report and Written Opinion for PCT/US2012/063660 dated Aug. 14, 2014.

* cited by examiner

FLUID PURIFICATION MEDIA AND CARTRIDGE

BACKGROUND

1. Field

Disclosed herein is a fluid purification cartridge containing a first fluid purification media having a rigid porous purification block, and a second fluid purification media containing an oxidizer. The fluid purification cartridge is particularly suitable for purifying water by removing contaminants, such as chlorine, therefrom, and for improving the taste and odor of the water, as well as reducing scale formation in equipment in contact with the water. Also disclosed herein is a fluid purification apparatus or system that includes the disclosed fluid purification cartridge.

2. Description of the Related Art

Embodiments of certain fluid purification cartridges and systems are disclosed in U.S. patent application Ser. Nos. 12/958,152; 12/879,064, and PCT/US2011/000830, the entire contents of each of which is incorporated herein by reference. These cartridges and systems include the use of a pleated nonwoven fabric as a purification media, disposed in connection with a rigid porous purification block. While this combination is effective, particularly in low water pressure environments, the use of the pleated nonwoven fabric imposes an additional cost on the purification cartridge.

Various purification media have been proposed that use blocks of activated carbon particles, zeolites, metal oxides, and other materials. Often, these materials purify fluids by one or more mechanisms, including size exclusion, physical entrapment, or chemical reaction of the contaminants. The latter two mechanisms generally require some physical interaction between the active purification elements (e.g., carbon particles) within the purification media and the contaminant-containing fluid to be purified.

The particles of active purification elements may be dispersed within, or agglomerated by, a binder of some sort, typically a polymeric binder. The design of these media is complex and difficult, typically requiring trade-offs between properties such as the activity of the filtration media in removing contaminants and the pressure drop of fluid across the purification media. For example, decreasing the average particle size of particles in the purification media may increase their activity in removing contaminants by increasing the specific surface area of the particles that is exposed to contaminant-containing fluid. However, such an approach may result in increased pressure drops across the purification media, which actually decreases the flow rate of fluid that may be purified using the purification media. This can lead to the need for multiple filtration systems in order to purify a commercially acceptable amount of fluid. Other design problems include balancing the need for structural integrity of the purification media under fluid pressure with the need for fluid to be able to penetrate the purification media and come into contact with the active purification elements therein.

For example, water purification media for use in refrigeration systems, such as residential and commercial refrigerators and freezers containing water lines, ice makers, and the like, generally require purification media that are capable of processing large amounts of water over a significant period of time without the need to change the filter frequently. A relatively low pressure drop in such systems is desirable in emerging economies because of the low water pressure generally available in such countries.

For example in a commercial point of use water purification in the U.S., the available water pressure is typically around 60 psi. However, purification media designed for use under such pressures would not provide adequate water flow in, e.g., Brazil, where the typically available water pressure is from 7-15 psi. Similarly, a purification media that is designed to require a water pressure of 60 psi to produce adequate flow would be unsuitable for use in a water line in a refrigerator in these countries, because water at a much lower pressure is generally all that is available.

At least part of the reason for the inability of conventional water purification systems to operate effectively under low water pressure conditions is the higher design pressure drop noted above. However, this high pressure drop is not simply a function of the design parameters of conventional purification media, but is a function of the particular active purification materials used therein. For example, purification media containing activated carbon derived from coal and the like according to conventional methods and used in conventionally designed purification media would yield a purification media that provides little or no water flow at a water pressure of 10 psi. In this regard, conventional purification media that are designed to remove bacteria from water and are rated at 0.2 micron will not provide adequate flow (if any) at a inlet pressure of 10 psi.

Another reason for the lack of effectiveness of conventional carbon block filters in emerging economies is the high water turbidity often encountered there. This can be due to a number of factors, and may be associated with the presence of pathogens or other contaminants in the water which should be removed to render it safer.

While a combination of a pleated filter element and a carbon block filter has been proposed in U.S. Patent Application Publication No. 2004/0206682. However, the arrangement suggested therein places the pleated filter element around the outer surface of the carbon block filter, so that incoming water encounters the pleated filter block prior to encountering the carbon block filter. Such an arrangement results in clogging and/or exhaustion of the pleated filter with contaminants, resulting in insufficient water flow through the filtration system, as well as insufficient removal of contaminants from the water which can be made to flow through the system.

While not wishing to be bound by theory, it is believe that an alternative to impaction and sieving is electrokinetic adsorption, where the media is charged and particles opposite to that charge are attracted and adsorbed. Membranes have been modified to provide some electropositive functionality, but none appear to be suitable for low pressure operating.

Examples of such materials are disclosed in U.S. Pat. Nos. 6,838,005; 7,311,752; 7,390,343; and 7,601,262. These materials, when used as water filtration media, have been found by the present inventions to be unsuitable for low pressure use, despite any suggestions to the contrary in the above cited documents. The present inventors have found that, even at low input pressures, the materials are subject to unsuitable amounts of compression and distortion, so that they are ineffective for practical use. In addition, the solution to this problem suggested by the patentees (placing multiple layers of the fabric in series) results in a significant pressure drop (e.g., 80% of incoming water pressure), making the material unsuitable for a low pressure installation. In addition, the extra layers of nonwoven fabric substantially increase the cost of this proposed solution. The nonwoven fabrics are disclosed to contain nanoalumina fibers.

Attempts to use microbiological interception filters are described in U.S. Pat. Nos. 6,913,154 and 6,959,820. However, these attempts use a so-called silver-cationic material-halide complex. Such a complex is difficult and expensive to prepare and use.

An embodiment of a radial flow purification system is described in U.S. Pat. Nos. 7,229,552 and 7,429,326. These systems do not use a nonwoven pleated fabric.

Another problem typically occurring in water supply systems and in circulating water systems relates to the formulation of mineral scale. Dissolved solids in the water can precipitate onto surfaces of water processing equipment, interfering with the operation of such equipment. For example, heat exchange surfaces in contact with water having mineral solids dissolved therein can become fouled as mineral scale deposits thereon, interfering with the designed heat transfer characteristics of the surface, and rendering a heat exchanger containing such a surface less efficient. Mechanical filtration is of limited usefulness in addressing such problems, as the main cause of scale is typically solids dissolved in the water, rather than suspended solid particles.

SUMMARY

It has now been found that a fluid purification cartridge that does not require the presence of a pleated nonwoven fabric provides purified fluids, such as water, that are improved in taste and odor, and have improved chlorine reduction when compared to ordinary activated carbon.

In one embodiment is disclosed a fluid purification cartridge containing a first fluid purification media that comprises a rigid, porous purification block formed from a porous polymeric material. In a particular embodiment, the rigid, porous purification block also contains an active material disposed therein, such as activated carbon or other sorbent, or an oxidizer. The fluid purification cartridge also contains a second fluid purification media, desirably an oxidizing material.

In a particular embodiment, the purification cartridge is arranged with a radial flow geometry. In a more particular embodiment, this radial flow geometry is embodied by having the first fluid purification media in the form of a porous purification block arranged as an annulus or tube, and having the second fluid purification media disposed inside the tube, both of which are disposed inside a housing having at least one inlet and at least one outlet, so that fluid to be purified passes into the housing through an inlet, and then first passes through the first fluid purification media, and then passes through the second fluid purification media. Alternatively, the fluid to be purified can be passed first through the second fluid purification media, and then through the first fluid purification media. The purified fluid can then exit the purification cartridge through an outlet.

The fluid purification cartridge disclosed herein can be desirably used to filter water, e.g., attached to a water supply as part of a drinking water supply facility at the point of use, or as a component in a household appliance that uses filtered water, such as an automatic dishwasher, laundry washing machine, refrigerator, ice machine, and the like. Accordingly, such devices and systems including the fluid purification cartridge disclosed herein form additional embodiments.

Embodiments of the purification cartridge disclosed herein can achieve a reduction in chlorine in water that is improved by as much as 20 times that of ordinary activated carbon filters, while using as much as 10 times less volume of filtration media. In addition, purification of water using the purification cartridge and system disclosed herein can help to reduce scale formation in appliances equipped therewith.

BRIEF DESCRIPTION OF DRAWINGS

FIG. 1A is a side view of the purification cartridge, and FIG. 1B is a top view of the purification cartridge.

DETAILED DESCRIPTION OF SPECIFIC EMBODIMENTS

The first fluid purification media comprises a rigid porous fluid purification block formed of a polymeric material. Desirably, the rigid porous fluid purification block also contains an active purification material, such as particulate carbon, disposed therein. As a result, the rigid porous fluid purification block serves to remove contaminants by both size exclusion involving the pores of the polymeric material, and by contact of the contaminants with the active purification material disposed therein.

As indicated above, a particularly suitable arrangement of the purification cartridge is for the rigid porous fluid purification block to be in the form of an annulus or tube, with the second purification media disposed adjacent to, and desirably inside, this annulus or tube, and the remaining description will be primarily focused on this radial flow geometry. It will be recognized, however, that other geometries are possible, and that the disclosure herein can be adapted to those other geometries using the teachings contained herein.

Figure 1A:
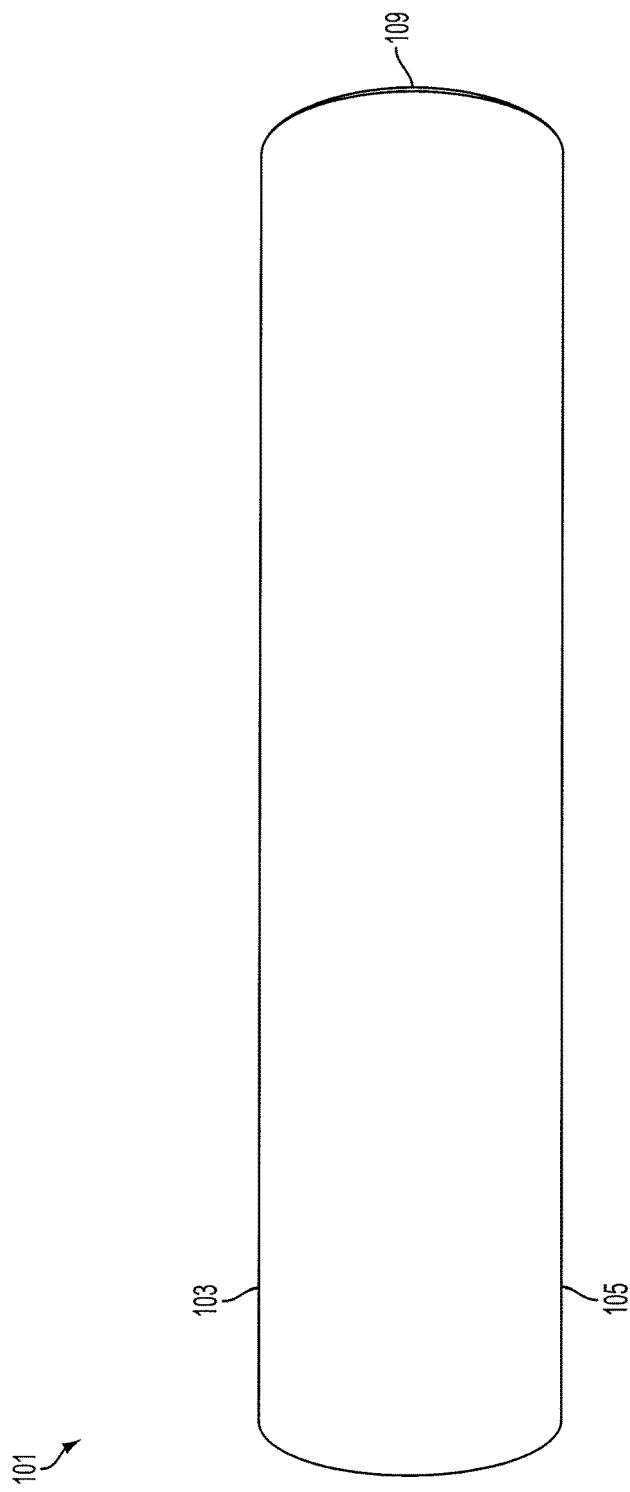
FIGS. 1A and 1B are schematic diagrams of an embodiment of a purification cartridge containing the first and second fluid purification media arranged for introduction into a purification cartridge.
Figure 1B:
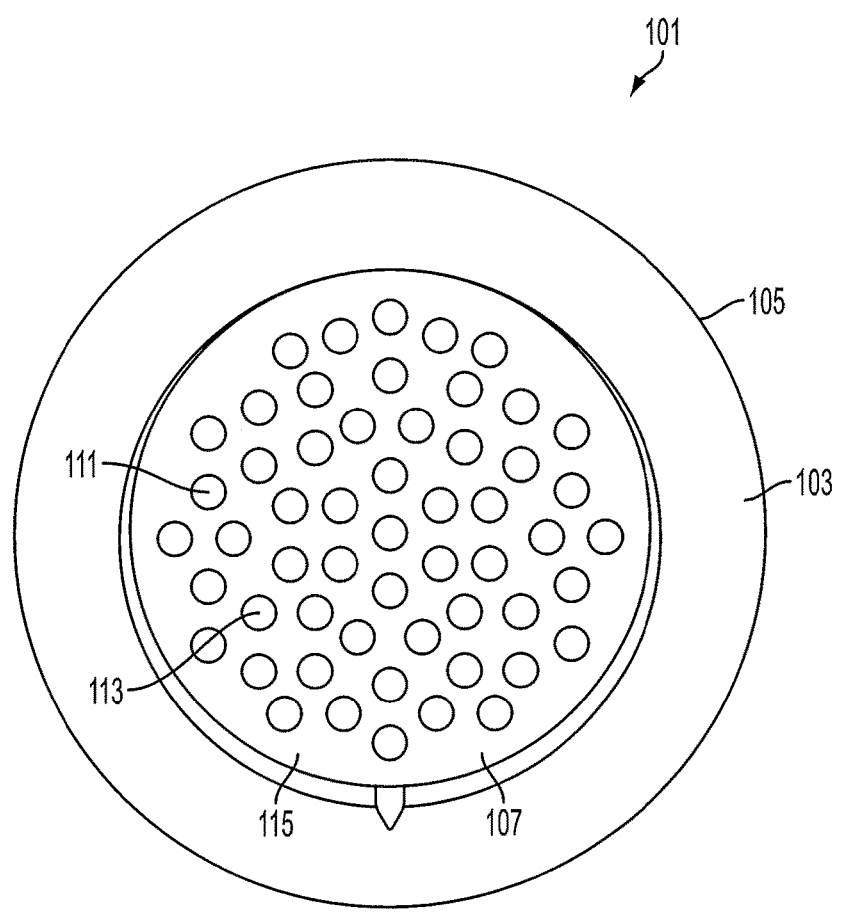

In the radial flow geometry, illustrated by the embodiment of a fluid purification cartridge 101 shown in FIGS. 1A and 1B, the fluid to be purified, e.g. water, more particularly water intended to be rendered potable or potable water intended to have one or more contaminants removed or decreased in concentration, is passed through the cartridge in the radial direction at some point in the purification process. In one exemplary embodiment, the fluid to be purified is passed first radially through the first fluid purification media 103 at some point or points along its outer longitudinal surface 105. After reaching the inner longitudinal surface 107, the fluid has undergone at least purification by size exclusion due to the porous nature of the first fluid purification media 103, and optionally additional purification by reaction, sorption, or other mechanism affecting dissolved or suspended species or contaminants.

The fluid then flows through the center of the tube or annulus 109, where a combination of radial flow and longitudinal flow brings the fluid into contact with the particles of the second fluid purification media, which is disposed in the center of tube or annulus 109.

At some point, the fluid flows longitudinally, through a bed of the second fluid purification material, and exits the cartridge at one end thereof. In the illustrated embodiment, the fluid flows through a layer of nonwoven fabric 111 and through an array of openings 113 in an endcap 115. This arrangement prevents the particles of the second purification media from exiting the cartridge with the purified fluid, while reducing or minimizing pressure drop across the cartridge.

The cartridge described above can be placed into a pressurized housing, typically including a sump, which surrounds the longitudinal portion and bottom of the cartridge and a purification head which provides for the flow fo fluid to be purified to a space between the sump inner surface and the outer longitudinal surface of the cartridge, and receives the purified fluid exiting through the endcap 115. Such a housing arrangement combined with the purification cartridge produces a purification system that keeps the unpurified water separate from the purified water. Such housings have been described elsewhere in the art, such as, e.g., U.S. Patent Application Publication No. 2010/0140156, the entire contents of which is incorporated herein by reference.

It will be understood that, if desired, the fluid flow through the fluid purification cartridge can be in the reverse direction, with the fluid first passing through the bed of second fluid purification material in the annular opening of the cartridge, and then passing through the first fluid purification material, and then exiting the cartridge and housing through an outlet.

Desirably, the porous purification block contains a polymeric material, such that the proportion of polymeric material, which can desirably be or include high density polyethylene (HDPE), in the rigid porous fluid purification block is from 25 wt % to 100 wt %, more particularly from 50 wt % to 99 wt %, even more particularly around 70 wt %. The remaining portion of the rigid porous fluid purification block can be formed from an active purification material, such as a material that reacts with or binds one or more contaminants in the fluid. One suitable active material includes carbon particles such as those described in U.S. patent application Ser. Nos. 12/958,152 and 12/879,064 and in PCT/US2011/000830, which are incorporated herein by reference.

More particularly, a particularly suitable carbon is a porous particulate carbon. Desirably, the porous particulate carbon has a porosity of about 40 to about 90% by volume, more particularly about 50% to about 90%, more particularly, about 70 to 85%, even more particularly, around 75%, as measured by nitrogen intrusion. Desirably, the average pore diameter ranges between 60 Å 20.000 Å. Desirably, the particles have a bulk density of 0.4 to 0.9 g/cm$^3$, more particularly, around 0.78 g/cm$^3$. Desirably, the particles have a specific surface area of from 1500 to 2000 m$^2$/g, measured by the Brunauer-Emmett-Teller (BET) technique. Such a fluid purification material is particularly suited for use in the first fluid purification media by, e.g., incorporation into the first rigid porous purification block. In addition, the fluid purification material is also suitable for use in the third fluid purification media, and/or as the fluid purification material of the fourth fluid purification media.

Figure 2:
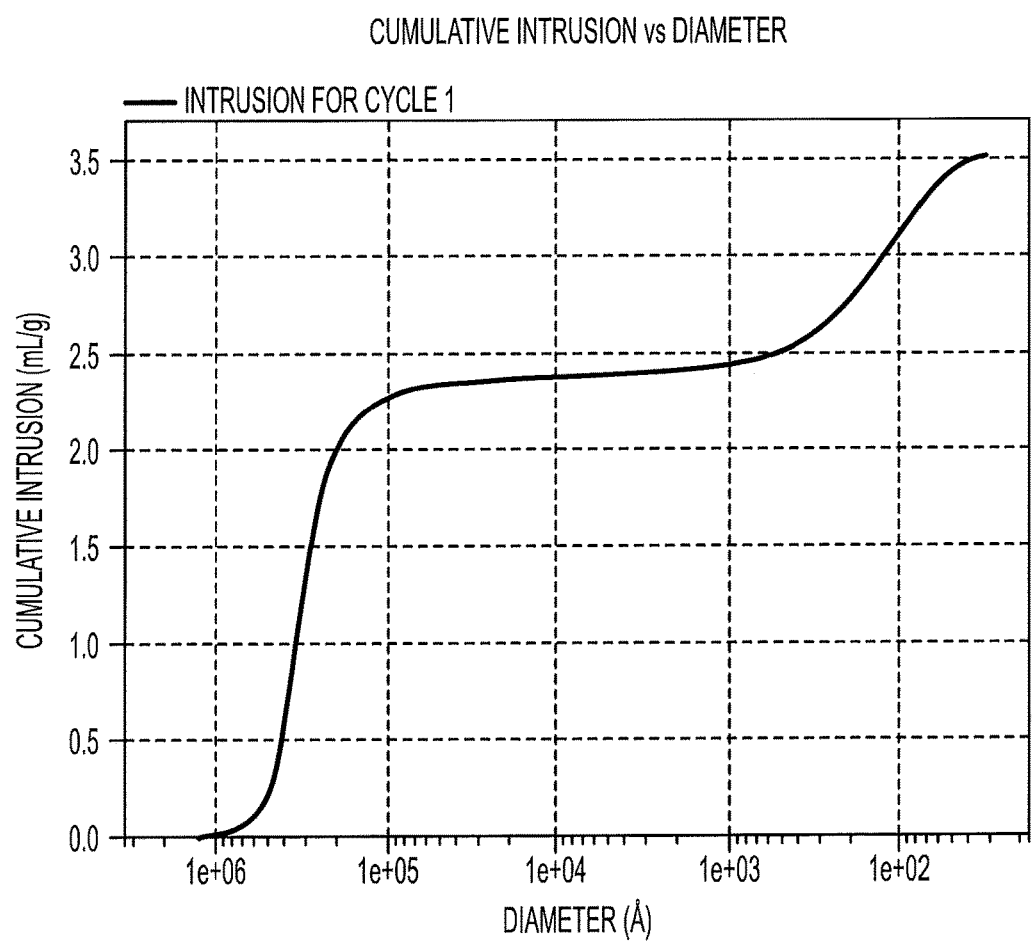
FIG. 2 is a graph of cumulative Hg intrusion vs. diameter for an embodiment of porous carbon used in an embodiment of porous purification block disclosed herein.
Figure 3:
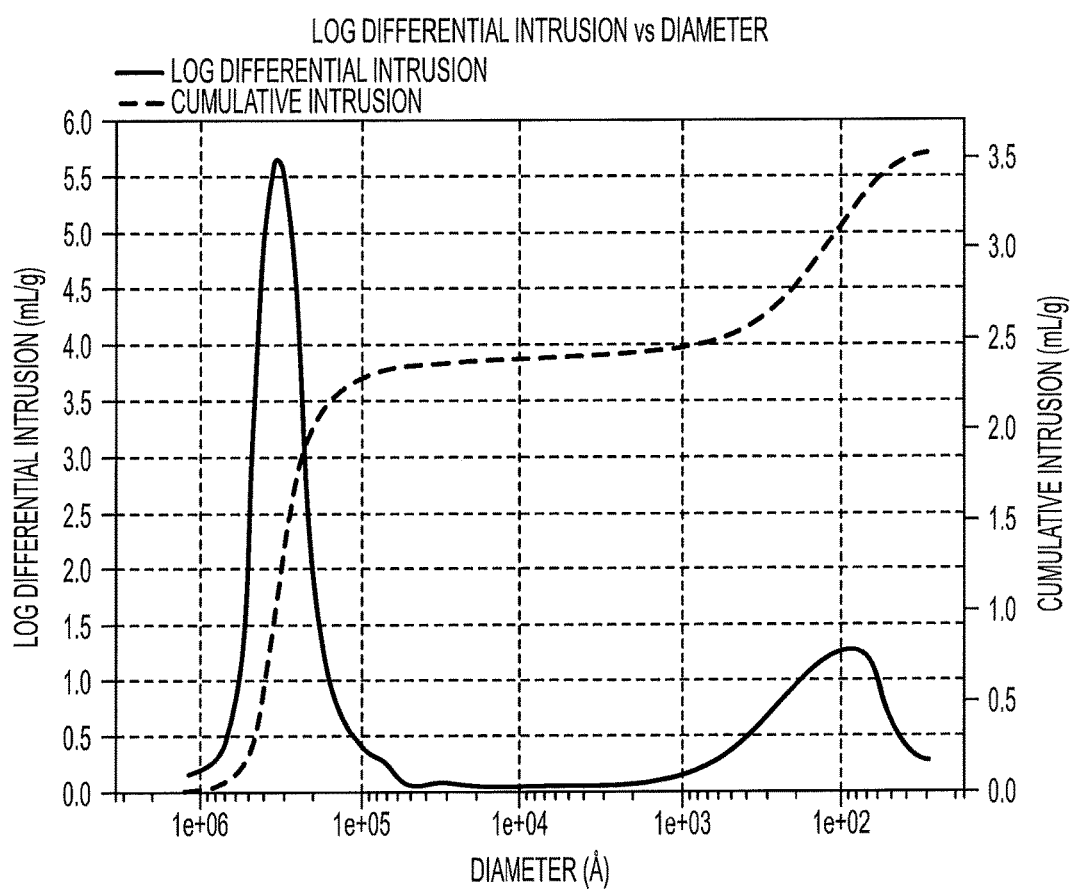
FIG. 3 is a graph of log differential intrusion vs. diameter for the porous carbon of FIG. 2.
Figure 4:
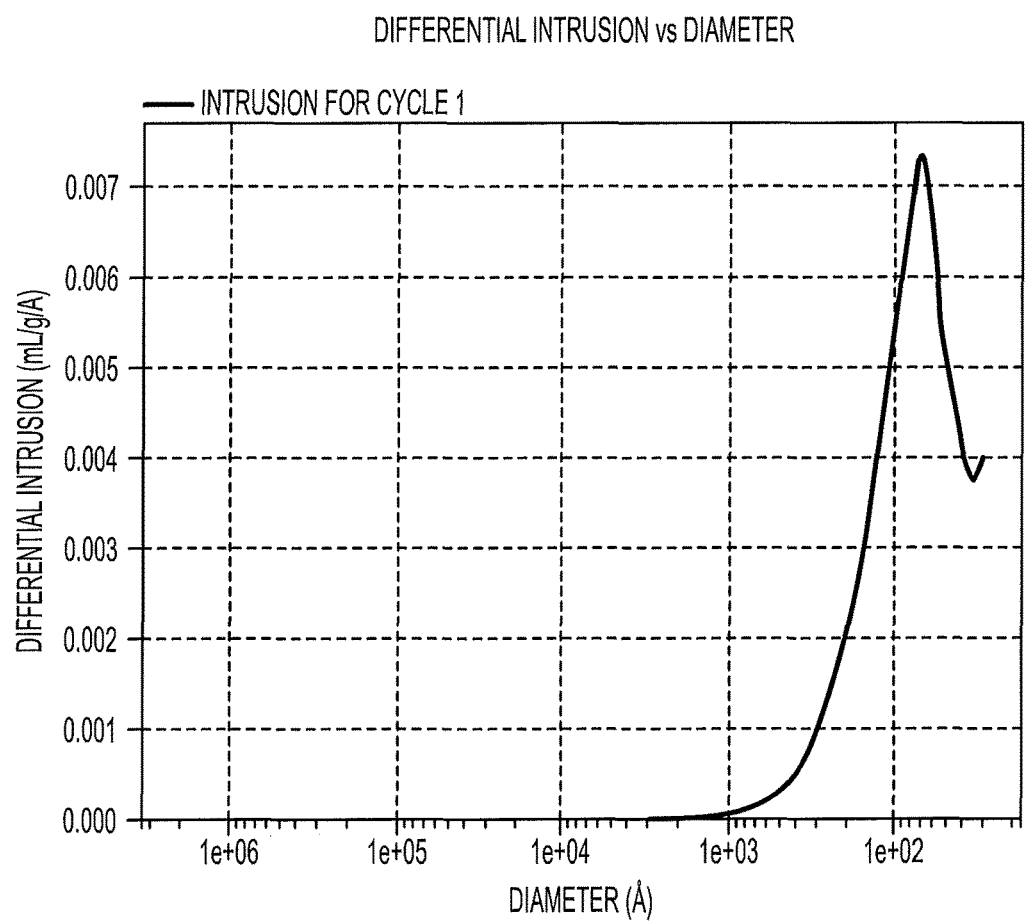
FIG. 4 is a graph of differential intrusion vs. diameter for the porous carbon of FIG. 2.
Figure 5:
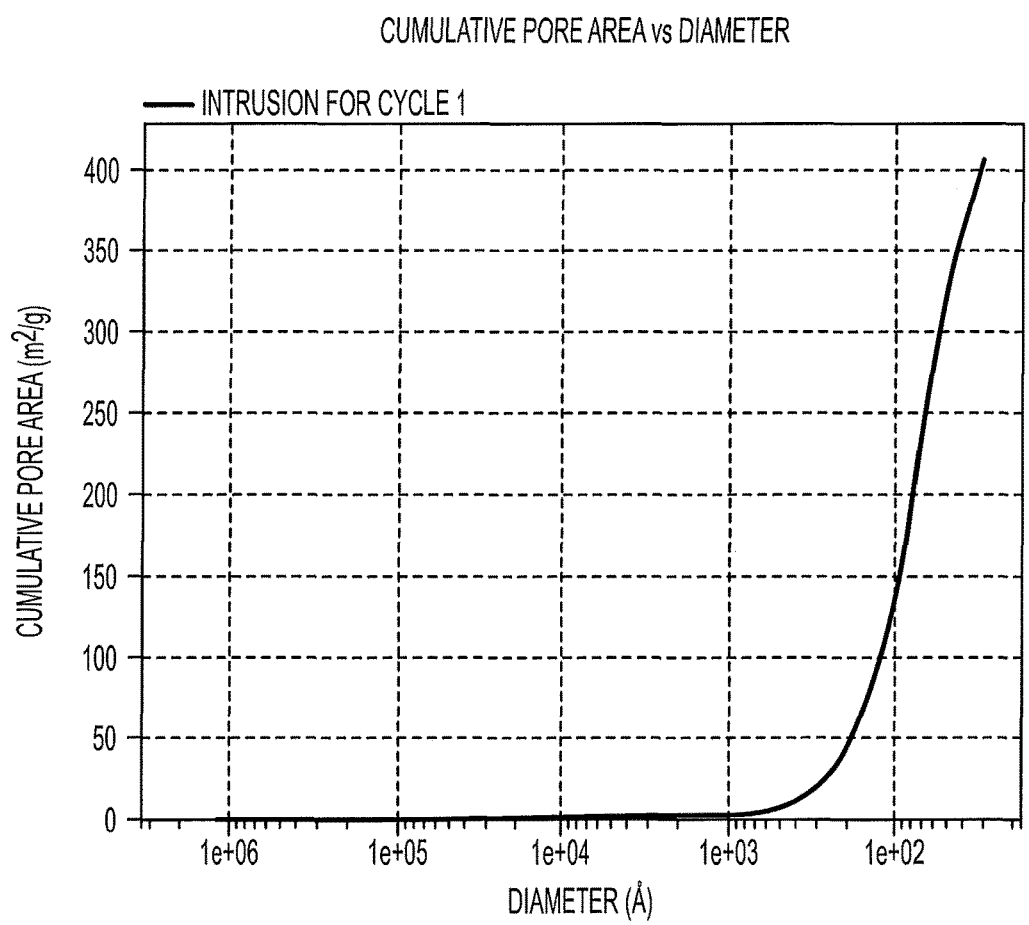
FIG. 5 is a graph of cumulative pore area vs. diameter for the porous carbon of FIG. 2.
Figure 6:
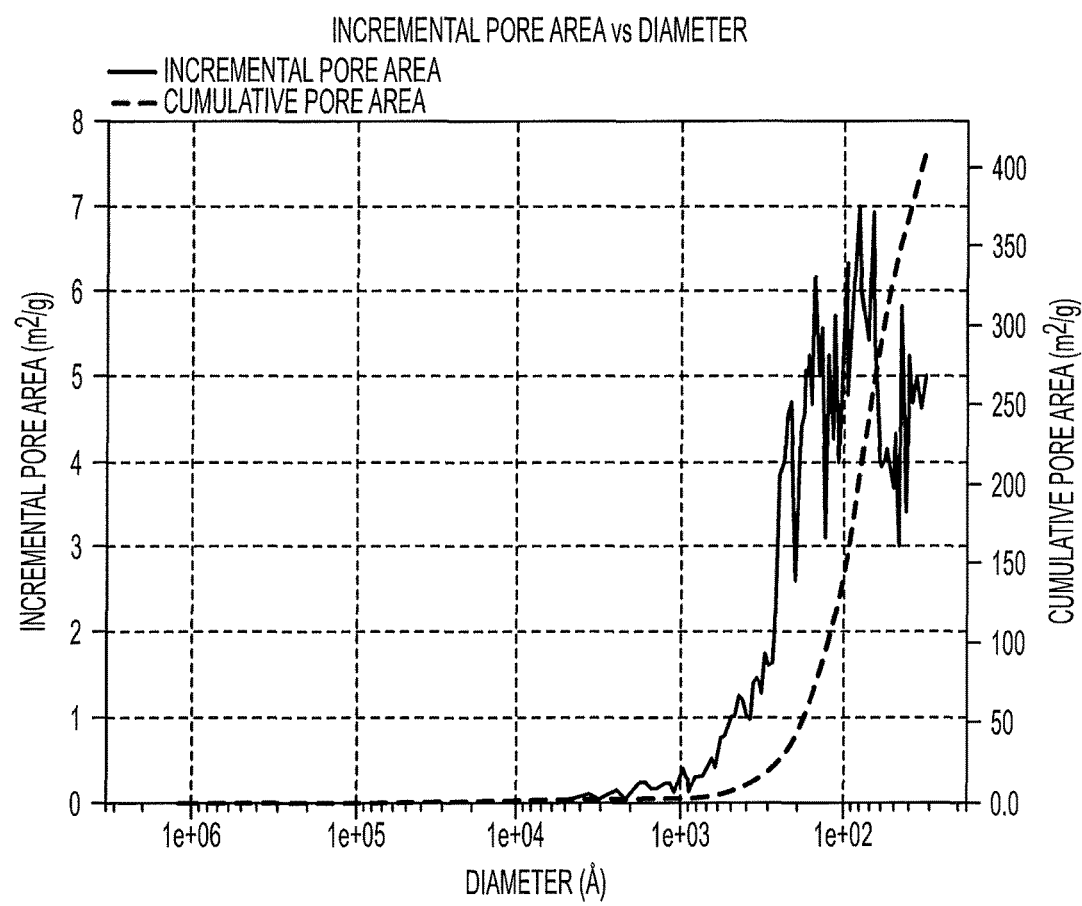
FIG. 6 is a graph of incremental pore area vs. diameter for the porous carbon of FIG. 2.

A particular suitable carbon for this fluid purification material was analyzed by Hg intrusion to assess its pore size distribution and other properties, and the results are given in Table 1A. A graph of cumulative intrusion vs. diameter is given in FIG. 2. A graph of log differential intrusion vs. diameter is given in FIG. 3. A graph of differential intrusion vs. diameter is given in FIG. 4. A graph of cumulative pore area vs. diameter is given in FIG. 5. A graph of incremental pore area vs. diameter is given in FIG. 6.

Another particularly suitable carbon contains particles having an average particle size in the range of 5 to 200 microns, more particularly in the range 5 to 60 microns. Such a suitable carbon was analyzed for particle size distribution and the results provided at Table 1B

TABLE 1A

Summary Report

| | | | |
|---|---|---|---|
| Penetrometer: | 389-(10) 5 Bulb, 1.131 Stem, Powder | | |
| Pen. Constant: | 21.630 µL/pF | Adv. Contact Angle: | 130.000 degrees |
| Pen. Weight: | 63.6931 g | Rec. Contact Angle: | 130.000 degrees |
| Stem Volume: | 1.1310 mL | Hg Surface Tension: | 485.000 dynes/cm |
| Max. Head Pressure: | 4.4500 psia | Hg Density: | 13.5335 g/mL |
| Pen. Volume : | 5.9250 mL | Sample Weight: | 0.3203 g |
| | | Assembly Weight: | 125.4047 g |

Low Pressure:

| | |
|---|---|
| Evacuation Pressure: | 50.000 µmHg |
| Evacuation Time: | 5 mins |
| Mercury Filling Pressure: | 1.46 psia |
| Equilibration Time: | 10 secs |

High Pressure:

| | |
|---|---|
| Equilibration Time: | 10 secs |
| No Blank Correction | |

TABLE 1A-continued

Intrusion Data Summary

| | |
|---|---|
| Total Intrusion Volume = | 3.5100 mL/g |
| Total Pore Area = | 406.678 m$^2$/g |
| Median Pore Diameter (Volume) = | 250806 A |
| Median Pore Diameter (Area) = | 77 A |
| Average Pore Diameter (4 V/A) = | 345 A |
| Bulk Density = | 0.2306 g/mL |
| Apparent (skeletal) Density = | 1.2110 g/mL |
| Porosity = | 80.9546% |
| Stem Volume Used = | 99% **** |

Tabular Report

| Mean Diameter (A) | Cumulative Pore Volume (mL/g) | Incremental Pore Volume (mL/g) | Cumulative Pore Area (m$^2$/g) | Incremental Pore Area (m$^2$/g) | % of Total Intrusion Volume |
|---|---|---|---|---|---|
| 1240882 | 0.0000 | 0.0000 | 0.000 | 0.000 | 0.0000 |
| 1049811 | 0.0242 | 0.0242 | 0.001 | 0.001 | 0.6891 |
| 719934 | 0.1248 | 0.1007 | 0.007 | 0.006 | 3.5569 |
| 510838 | 0.4092 | 0.2843 | 0.029 | 0.022 | 11.6570 |
| 382462 | 1.1856 | 0.7765 | 0.110 | 0.081 | 33.7787 |
| 289673 | 1.7237 | 0.5380 | 0.184 | 0.074 | 49.1074 |
| 233019 | 1.9650 | 0.2413 | 0.226 | 0.041 | 55.9814 |
| 191168 | 2.1124 | 0.1475 | 0.257 | 0.031 | 60.1834 |
| 154902 | 2.1966 | 0.0842 | 0.278 | 0.022 | 62.5817 |
| 125598 | 2.2482 | 0.0516 | 0.295 | 0.016 | 64.0511 |
| 101492 | 2.2870 | 0.0388 | 0.310 | 0.015 | 65.1556 |
| 84446 | 2.3059 | 0.0190 | 0.319 | 0.009 | 65.6961 |
| 75438 | 2.3159 | 0.0100 | 0.324 | 0.005 | 65.9798 |
| 66309 | 2.3345 | 0.0186 | 0.335 | 0.011 | 66.5102 |
| 52497 | 2.3380 | 0.0035 | 0.338 | 0.003 | 66.6085 |
| 40420 | 2.3445 | 0.0065 | 0.345 | 0.006 | 66.7950 |
| 32854 | 2.3514 | 0.0069 | 0.353 | 0.008 | 66.9917 |
| 26622 | 2.3576 | 0.0062 | 0.362 | 0.009 | 67.1681 |
| 21561 | 2.3621 | 0.0045 | 0.371 | 0.008 | 67.2970 |
| 17605 | 2.3661 | 0.0039 | 0.380 | 0.009 | 67.4089 |
| 14308 | 2.3699 | 0.0038 | 0.390 | 0.011 | 67.5174 |
| 11569 | 2.3740 | 0.0042 | 0.405 | 0.014 | 67.6361 |
| 9200 | 2.3777 | 0.0037 | 0.421 | 0.016 | 67.7412 |
| 7346 | 2.3812 | 0.0035 | 0.440 | 0.019 | 67.8396 |
| 6008 | 2.3845 | 0.0033 | 0.462 | 0.022 | 67.9345 |
| 4466 | 2.3943 | 0.0098 | 0.549 | 0.087 | 68.2126 |
| 3432 | 2.3948 | 0.0005 | 0.555 | 0.006 | 68.2262 |
| 2841 | 2.4043 | 0.0095 | 0.689 | 0.134 | 68.4975 |
| 2289 | 2.4049 | 0.0006 | 0.699 | 0.010 | 68.5145 |
| 1909 | 2.4161 | 0.0112 | 0.934 | 0.235 | 68.8333 |
| 1473 | 2.4212 | 0.0051 | 1.073 | 0.139 | 68.9791 |
| 1294 | 2.4275 | 0.0063 | 1.268 | 0.195 | 69.1588 |
| 1141 | 2.4336 | 0.0061 | 1.481 | 0.213 | 69.3318 |
| 1051 | 2.4358 | 0.0023 | 1.567 | 0.086 | 69.3962 |
| 966 | 2.4450 | 0.0092 | 1.946 | 0.379 | 69.6573 |
| 876 | 2.4494 | 0.0044 | 2.147 | 0.201 | 69.7828 |
| 819 | 2.4555 | 0.0061 | 2.444 | 0.296 | 69.9558 |
| 765 | 2.4611 | 0.0056 | 2.736 | 0.292 | 70.1152 |
| 722 | 2.4662 | 0.0051 | 3.020 | 0.284 | 70.2610 |
| 683 | 2.4724 | 0.0062 | 3.382 | 0.363 | 70.4374 |
| 639 | 2.4808 | 0.0085 | 3.912 | 0.529 | 70.6782 |
| 601 | 2.4865 | 0.0057 | 4.292 | 0.380 | 70.8410 |
| 565 | 2.4972 | 0.0107 | 5.051 | 0.759 | 71.1462 |
| 525 | 2.5071 | 0.0099 | 5.804 | 0.753 | 71.4277 |
| 489 | 2.5191 | 0.0120 | 6.788 | 0.984 | 71.7702 |
| 456 | 2.5307 | 0.0115 | 7.802 | 1.013 | 72.0991 |
| 425 | 2.5452 | 0.0145 | 9.168 | 1.367 | 72.5129 |
| 401 | 2.5539 | 0.0087 | 10.035 | 0.867 | 72.7605 |
| 383 | 2.5647 | 0.0108 | 11.167 | 1.132 | 73.0691 |
| 366 | 2.5738 | 0.0090 | 12.156 | 0.989 | 73.3268 |
| 349 | 2.5874 | 0.0136 | 13.711 | 1.555 | 73.7134 |
| 332 | 2.5987 | 0.0113 | 15.073 | 1.362 | 74.0356 |
| 319 | 2.6093 | 0.0106 | 16.402 | 1.330 | 74.3375 |
| 306 | 2.6218 | 0.0125 | 18.037 | 1.635 | 74.6936 |
| 293 | 2.6333 | 0.0115 | 19.611 | 1.574 | 75.0225 |
| 282 | 2.6453 | 0.0120 | 21.315 | 1.704 | 75.3651 |
| 272 | 2.6558 | 0.0105 | 22.854 | 1.539 | 75.6635 |
| 262 | 2.6696 | 0.0138 | 24.959 | 2.105 | 76.0569 |
| 248 | 2.6934 | 0.0238 | 28.796 | 3.837 | 76.7352 |
| 232 | 2.7162 | 0.0227 | 32.711 | 3.915 | 77.3829 |
| 218 | 2.7416 | 0.0255 | 37.391 | 4.680 | 78.1087 |
| 204 | 2.7650 | 0.0233 | 41.955 | 4.564 | 78.7734 |

TABLE 1A-continued

| | | | | | |
|---|---|---|---|---|---|
| 195 | 2.7776 | 0.0126 | 44.537 | 2.582 | 79.1329 |
| 189 | 2.7915 | 0.0139 | 47.479 | 2.942 | 79.5297 |
| 182 | 2.8116 | 0.0201 | 51.900 | 4.421 | 80.1028 |
| 174 | 2.8297 | 0.0181 | 56.054 | 4.155 | 80.6183 |
| 167 | 2.8505 | 0.0208 | 61.050 | 4.996 | 81.2118 |
| 159 | 2.8710 | 0.0205 | 66.189 | 5.139 | 81.7951 |
| 153 | 2.8890 | 0.0180 | 70.892 | 4.703 | 82.3072 |
| 146 | 2.9121 | 0.0231 | 77.202 | 6.309 | 82.9651 |
| 140 | 2.9299 | 0.0179 | 82.293 | 5.091 | 83.4738 |
| 135 | 2.9519 | 0.0219 | 88.796 | 6.503 | 84.0978 |
| 130 | 2.9630 | 0.0112 | 92.230 | 3.434 | 84.4166 |
| 127 | 2.9760 | 0.0130 | 96.307 | 4.077 | 84.7863 |
| 125 | 2.9846 | 0.0086 | 99.057 | 2.750 | 85.0305 |
| 122 | 2.9983 | 0.0137 | 103.543 | 4.486 | 85.4205 |
| 118 | 3.0152 | 0.0169 | 109.249 | 5.706 | 85.9020 |
| 115 | 3.0262 | 0.0111 | 113.088 | 3.839 | 86.2174 |
| 113 | 3.0397 | 0.0135 | 117.860 | 4.772 | 86.6007 |
| 110 | 3.0552 | 0.0155 | 123.503 | 5.643 | 87.0415 |
| 107 | 3.0680 | 0.0129 | 128.319 | 4.815 | 87.4078 |
| 105 | 3.0779 | 0.0099 | 132.098 | 3.779 | 87.6893 |
| 103 | 3.0886 | 0.0107 | 136.275 | 4.177 | 87.9945 |
| 100 | 3.1004 | 0.0118 | 140.966 | 4.691 | 88.3303 |
| 98 | 3.1121 | 0.0117 | 145.710 | 4.744 | 88.6626 |
| 97 | 3.1197 | 0.0076 | 148.862 | 3.153 | 88.8797 |
| 95 | 3.1330 | 0.0133 | 154.486 | 5.624 | 89.2595 |
| 92 | 3.1504 | 0.0174 | 162.031 | 7.544 | 89.7546 |
| 90 | 3.1606 | 0.0102 | 166.589 | 4.559 | 90.0463 |
| 88 | 3.1737 | 0.0131 | 172.546 | 5.957 | 90.4194 |
| 86 | 3.1843 | 0.0106 | 177.472 | 4.926 | 90.7212 |
| 84 | 3.1965 | 0.0121 | 183.235 | 5.763 | 91.0671 |
| 83 | 3.2067 | 0.0102 | 188.193 | 4.958 | 91.3588 |
| 81 | 3.2202 | 0.0135 | 194.851 | 6.658 | 91.7420 |
| 79 | 3.2347 | 0.0145 | 202.228 | 7.377 | 92.1557 |
| 77 | 3.2474 | 0.0127 | 208.862 | 6.634 | 92.5186 |
| 75 | 3.2562 | 0.0088 | 213.540 | 4.678 | 92.7696 |
| 74 | 3.2684 | 0.0121 | 220.111 | 6.570 | 93.1155 |
| 73 | 3.2765 | 0.0081 | 224.572 | 4.461 | 93.3461 |
| 71 | 3.2860 | 0.0095 | 229.904 | 5.332 | 93.6174 |
| 70 | 3.2954 | 0.0094 | 235.260 | 5.356 | 93.8854 |
| 69 | 3.3061 | 0.0107 | 241.476 | 6.215 | 94.1906 |
| 68 | 3.3163 | 0.0102 | 247.532 | 6.057 | 94.4822 |
| 66 | 3.3252 | 0.0088 | 252.838 | 5.306 | 94.7332 |
| 65 | 3.3327 | 0.0075 | 257.425 | 4.587 | 94.9469 |
| 64 | 3.3397 | 0.0070 | 261.780 | 4.356 | 95.1469 |
| 63 | 3.3513 | 0.0117 | 269.160 | 7.380 | 95.4793 |
| 62 | 3.3588 | 0.0075 | 274.008 | 4.847 | 95.6929 |
| 61 | 3.3665 | 0.0076 | 279.020 | 5.012 | 95.9100 |
| 60 | 3.3728 | 0.0063 | 283.243 | 4.224 | 96.0897 |
| 59 | 3.3785 | 0.0057 | 287.129 | 3.885 | 96.2525 |
| 58 | 3.3837 | 0.0052 | 290.744 | 3.615 | 96.4017 |
| 57 | 3.3898 | 0.0061 | 295.002 | 4.259 | 96.5747 |
| 56 | 3.3946 | 0.0048 | 298.396 | 3.394 | 96.7104 |
| 55 | 3.3998 | 0.0052 | 302.188 | 3.792 | 96.8596 |
| 54 | 3.4054 | 0.0056 | 306.313 | 4.125 | 97.0190 |
| 53 | 3.4096 | 0.0042 | 309.435 | 3.122 | 97.1377 |
| 53 | 3.4146 | 0.0050 | 313.240 | 3.805 | 97.2801 |
| 51 | 3.4209 | 0.0063 | 318.148 | 4.908 | 97.4599 |
| 50 | 3.4259 | 0.0050 | 322.125 | 3.977 | 97.6023 |
| 49 | 3.4306 | 0.0048 | 325.987 | 3.862 | 97.7380 |
| 48 | 3.4351 | 0.0045 | 329.726 | 3.738 | 97.8668 |
| 47 | 3.4401 | 0.0050 | 333.941 | 4.215 | 98.0093 |
| 46 | 3.4444 | 0.0043 | 337.628 | 3.687 | 98.1314 |
| 46 | 3.4488 | 0.0044 | 341.492 | 3.864 | 98.2568 |
| 45 | 3.4520 | 0.0032 | 344.360 | 2.868 | 98.3484 |
| 44 | 3.4550 | 0.0030 | 347.049 | 2.689 | 98.4332 |
| 43 | 3.4612 | 0.0062 | 352.775 | 5.726 | 98.6095 |
| 42 | 3.4651 | 0.0039 | 356.513 | 3.738 | 98.7214 |
| 41 | 3.4686 | 0.0035 | 359.861 | 3.348 | 98.8198 |
| 40 | 3.4723 | 0.0037 | 363.506 | 3.645 | 98.9249 |
| 39 | 3.4774 | 0.0051 | 368.698 | 5.192 | 99.0708 |
| 38 | 3.4822 | 0.0048 | 373.689 | 4.992 | 99.2064 |
| 37 | 3.4864 | 0.0043 | 378.322 | 4.632 | 99.3285 |
| 36 | 3.4892 | 0.0027 | 381.347 | 3.025 | 99.4065 |
| 35 | 3.4950 | 0.0058 | 388.011 | 6.664 | 99.5727 |
| 34 | 3.4988 | 0.0038 | 392.543 | 4.533 | 99.6812 |
| 33 | 3.5023 | 0.0035 | 396.763 | 4.220 | 99.7796 |
| 32 | 3.5062 | 0.0039 | 401.714 | 4.951 | 99.8915 |
| 31 | 3.5100 | 0.0038 | 406.678 | 4.963 | 100.0000 |

In a particular embodiment, the carbon particles have an average particle size in the range of about 10 to 200 μm, more particularly, about 10 to 100 μm. In a particular embodiment, the particles have a particle size distribution such that 5-25% by weight of the particles are smaller than 325 mesh and 7% by weight of the particles are larger than 80 mesh. Desirably, such particles are obtained from a wood-based carbon, rather than from a coal based carbon. Desirably, these particles can be acid-reacted by reacting wood-based carbon with strong acid under pressure, to obtain acid-reacted carbon, and heating the acid-reacted carbon in a gas atmosphere at around 780° C. for 10-16 hours. In some circumstances, a coconut-shell based carbon can be used, although a wood-based carbon is more desirable for ease of handling and processing. The carbon particles can be sized by suitable sizing methods and their average size and size distribution adjusted by screening and measuring methods known in the art, such as using a laser measurement device, such as a Coulter Multisizer. Sizing and screening can occur before or after the additional processing described herein.

Figure 14:
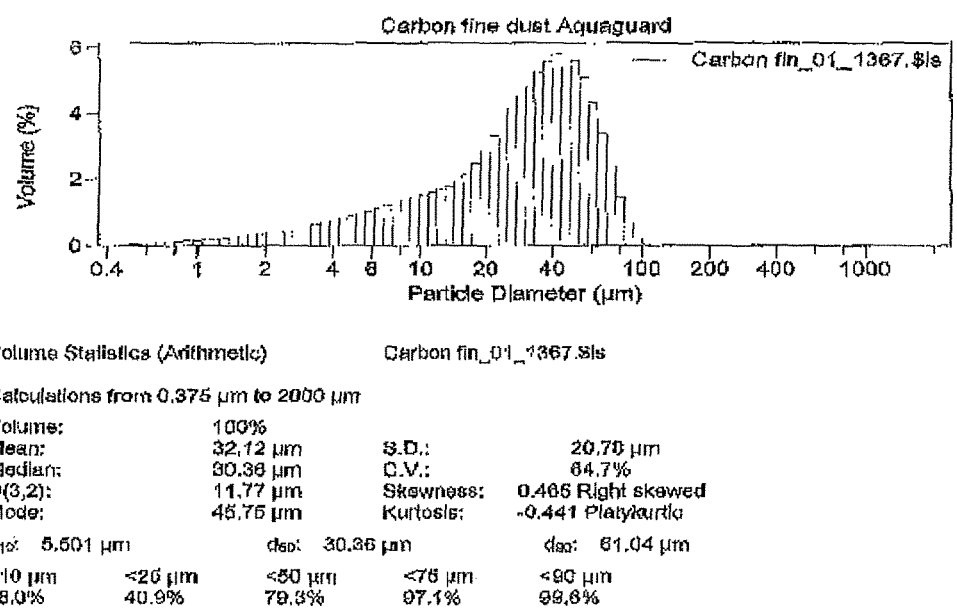
FIG. 14 is a graph of the particle size distribution according to an embodiment disclosed herein.

A representative particle size distribution for particulate carbon suitable for use in a purification media as disclosed herein, whether as individual particles or as part of a porous block, is given below in Table 1B, and shown in FIG. 14.

TABLE 1B

Carbon fin_01_1367.$1s

| Channel Number | Channel Diameter (Lower) μm | Diff. Volume % |
|---|---|---|
| 1 | 0.37512 | 0.0130218 |
| 2 | 0.4116 | 0.0231357 |
| 3 | 0.45206 | 0.0344625 |
| 4 | 0.49625 | 0.0499208 |
| 5 | 0.54477 | 0.064024 |
| 6 | 0.69802 | 0.0779544 |
| 7 | 0.65649 | 0.0925082 |
| 8 | 0.72088 | 0.103709 |
| 9 | 0.79113 | 0.125527 |
| 10 | 0.86848 | 0.143297 |
| 11 | 0.95328 | 0.162854 |
| 12 | 1.0456 | 0.164855 |
| 13 | 1.1480 | 0.208489 |
| 14 | 1.2812 | 0.238342 |
| 15 | 1.3845 | 0.286775 |
| 16 | 1.6109 | 0.298128 |
| 17 | 1.6685 | 0.333783 |
| 18 | 1.8318 | 0.372058 |
| 19 | 2.0107 | 0.412757 |
| 20 | 2.2072 | 0.456112 |
| 21 | 2.428 | 0.502625 |
| 22 | 2.6609 | 0.551967 |
| 23 | 2.92 | 0.6037 |
| 24 | 3.2054 | 0.657918 |
| 25 | 3.6188 | 0.715842 |
| 26 | 3.8826 | 0.777647 |
| 27 | 4.2406 | 0.843435 |
| 28 | 4.6561 | 0.91206 |
| 29 | 5.1102 | 0.98944 |
| 30 | 5.3098 | 1.05059 |
| 31 | 6.1582 | 1.13744 |
| 32 | 6.7003 | 1.2170 |
| 33 | 7.4212 | 1.29677 |
| 34 | 8.1487 | 1.37393 |
| 35 | 8.0482 | 1.45169 |
| 36 | 9.8176 | 1.5318 |
| 37 | 10.777 | 1.61343 |
| 38 | 11.631 | 1.69741 |
| 39 | 12.938 | 1.79651 |
| 40 | 14.257 | 1.93831 |
| 41 | 15.851 | 2.15542 |
| 42 | 17.181 | 2.4661 |

TABLE 1B-continued

Carbon fin_01_1367.$1s

| Channel Number | Channel Diameter (Lower) μm | Diff. Volume % |
|---|---|---|
| 43 | 18.831 | 2.86049 |
| 44 | 20.705 | 3.30018 |
| 45 | 22.729 | 3.73829 |
| 46 | 24.951 | 4.14841 |
| 47 | 27.391 | 4.52407 |
| 48 | 30.068 | 4.88725 |
| 49 | 33.008 | 5.24151 |
| 50 | 38.235 | 5.58004 |
| 51 | 39.778 | 5.76071 |
| 52 | 43.687 | 5.81811 |
| 53 | 47.936 | 5.58605 |
| 54 | 62.622 | 5.09101 |
| 55 | 67.787 | 4.32241 |
| 56 | 63.414 | 3.37888 |
| 57 | 69.614 | 2.3837 |
| 58 | 78.42 | 1.45817 |
| 59 | 83.691 | 0.695701 |
| 60 | 92.082 | 0.227894 |
| 61 | 101.1 | 0.0303121 |
| 62 | 110.98 | 0.0024604 |
| 63 | 121.83 | 0 |
| 64 | 133.74 | 0 |
| 65 | 146.81 | 0 |
| 66 | 181.17 | 0 |
| 67 | 170.92 | 0 |
| 68 | 194.22 | 0 |
| 69 | 213.21 | 0 |
| 70 | 234.05 | 0 |
| 71 | 255.94 | 0 |
| 72 | 282.08 | 0 |
| 73 | 309.63 | 0 |
| 74 | 399.9 | 0 |
| 75 | 373.13 | 0 |
| 76 | 409.81 | 0 |
| 77 | 449.88 | 0 |
| 78 | 403.62 | 0 |
| 79 | 541.89 | 0 |
| 80 | 594.85 | 0 |
| 81 | 653.01 | 0 |
| 82 | 716.85 | 0 |
| 83 | 766.93 | 0 |
| 84 | 869.07 | 0 |
| 85 | 948.32 | 0 |
| 86 | 1041 | 0 |
| 87 | 1142.0 | 0 |
| 88 | 1254.5 | 0 |
| 89 | 1377.2 | 0 |
| 90 | 1511.8 | 0 |
| 91 | 1859.6 | 0 |
| 92 | 1821.9 | 0 |
|  | 2000 |  |

In a particular embodiment, the additional processing of the particles includes acid reacting. More specifically, this can desirably comprise introducing the particles into a reactor, where they are contacted with strong phosphoric acid (desirably, 85-99%) under a pressure of 200-300 psi for a period of time ranging between 1-4 hours, desirably about 1 hour. Following this reaction, the particles are washed with water and transferred to a furnace for heat treating. Desirably, the particles are heat treated in a furnace in e.g., nitrogen, ammonia, or $CO_2$ atmosphere, at a temperature ranging between about 700° and 1000° C., more particularly between about 700° and 890° C. for a period of time, generally ranging from about 5 to about 24 hours. The result of this processing is carbon particles having a porosity of 50-90%, by volume. The carbon is sufficiently active that one gram can process 470 gallons of water having a chlorine content of 2 ppm, which is removed from the water by the carbon. If necessary or desirable, the particles can ground further, e.g., in an air jet, in order to adjust their size characteristics.

The carbon particles can then be formed into a rigid porous purification block by combination with a porous polymeric binder. Such a rigid porous purification block is, e.g., suitable for use as a first fluid purification media. In general, it is desirable to use a carbon loading of about 10-30% by weight, more particularly about 15-30% based on the total weight of the porous purification block. The porous purification block can desirably contain from about 65 to 90%, more particularly about 70 to 90%, even more particularly, about 70-85% by weight of porous polymer, such as high density polyethylene (HDPE) polypropylene, or ultra high molecular weight polyethylene (UHMWPE). Desirably, the HDPE can have an average molecular weight of around 700,000. Desirably, the porous purification block can have average pore sizes ranging between 2,000 and 60,000 Å, more particularly between 10,000 and 60,000 Å. Desirably, the void volume of the porous block can be 30-70%, more particularly, about 40%. The porous purification block can be produced by a number of different processes, such as blow molding, extrusion, and the like. Desirably, the polymeric material of the porous purification block has a micron rating from 1-150, more particularly from 1-20.

Additionally or alternatively, the rigid porous purification block can contain other fluid purification materials in addition to, or in place of, the carbon particles. These can include titanium oxide or zinc oxide, e.g., in particular nanoparticulate zinc oxide, or nanoparticulate titanium oxide, optionally in a silica matrix, ranging from about 0.01 to about 0.1%, more particularly about 0.06%, by weight, based on the total weight of the porous purification block. In an alternative embodiment, such metal oxide particles can be present in an amount between 5 and 10 wt %, based on the total weight of the rigid porous purification block. Other suitable fluid purification materials include zeolite particles, zirconia particles, alumina nanofibers (e.g., in amounts ranging from 2-3% by weight, based on the total weight of the porous purification block), aluminosilicate fibers or particles, and the like.

For example, a rigid porous purification block can be formed by combining 80% by weight HDPE and 20% by weight of a combination of aluminosilicate and nanozinc particles (Alusilnz™, Selecto, Inc.).

In a particular embodiment, the rigid porous purification block can be formed by mixing the fluid purification materials, e.g. the particulate carbon described above, with particles of porous polymer in a mold of the size and shape of the desired porous purification block, and heating in an oven, using a steam molding process, or using infrared heating. Desirably, the particles of porous polymer have an average particle size in the range of 10-50 μm, more particularly, 20-40 μm. Desirably, the binder particles have a high porosity relative to the porosity of typical polymeric binders. Porosities of 40-70% are desirable. In one embodiment, the mixture can desirably be heated in the mold for about 45 minutes at a temperature of around 400° F. In another embodiment, the mixture can be molded with steam heating or infrared heating in order to allow the HDPE or other polymeric material to slowly soften. This allows for the formation of a polymeric structure that has 60-70% porosity.

Figure 7:
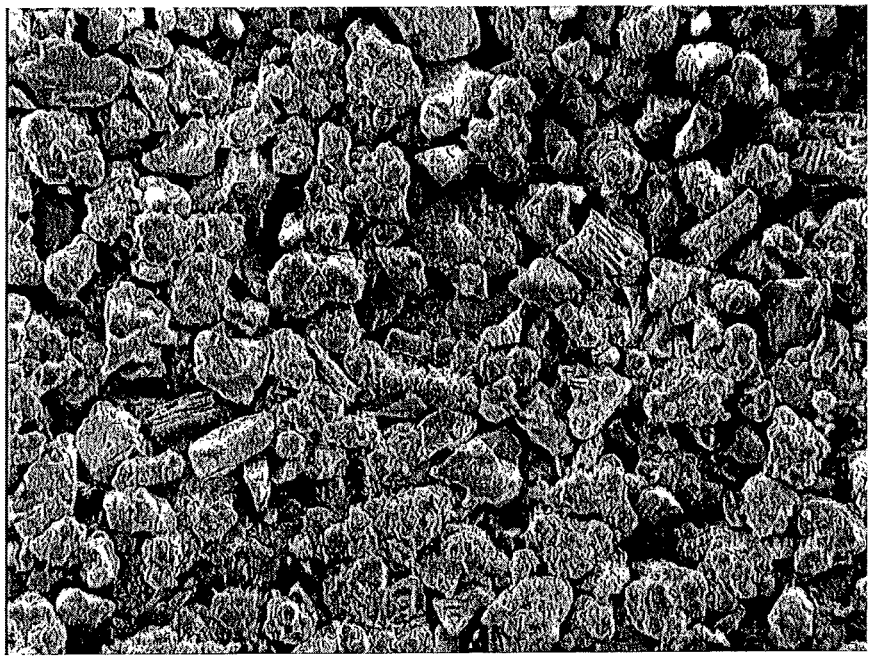
FIG. 7 is a photomicrograph of a mixture of porous carbon and polymer according to an embodiment disclosed herein.
Figure 8:
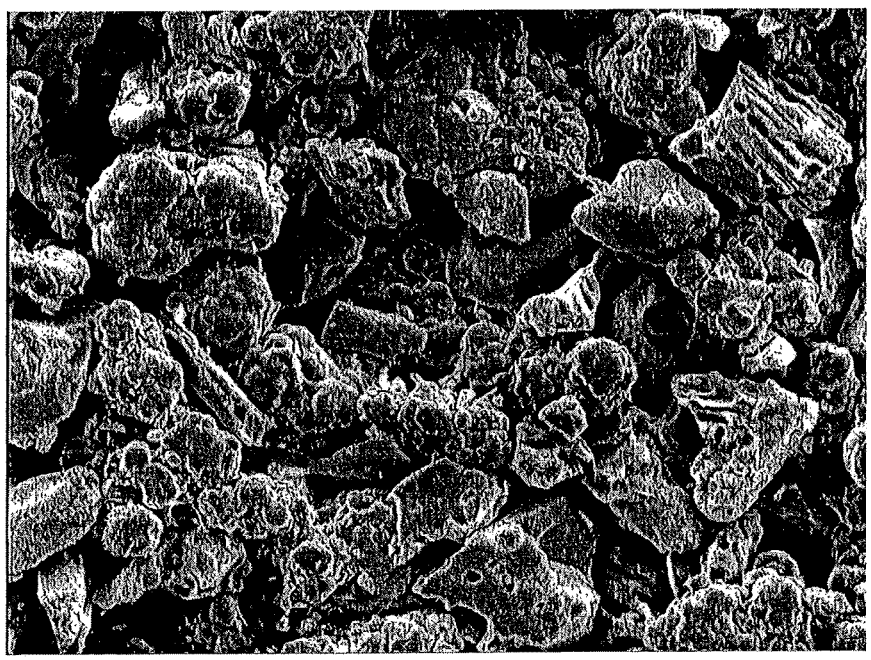
FIG. 8 is a magnified portion of the material shown in FIG. 7.
Figure 9:
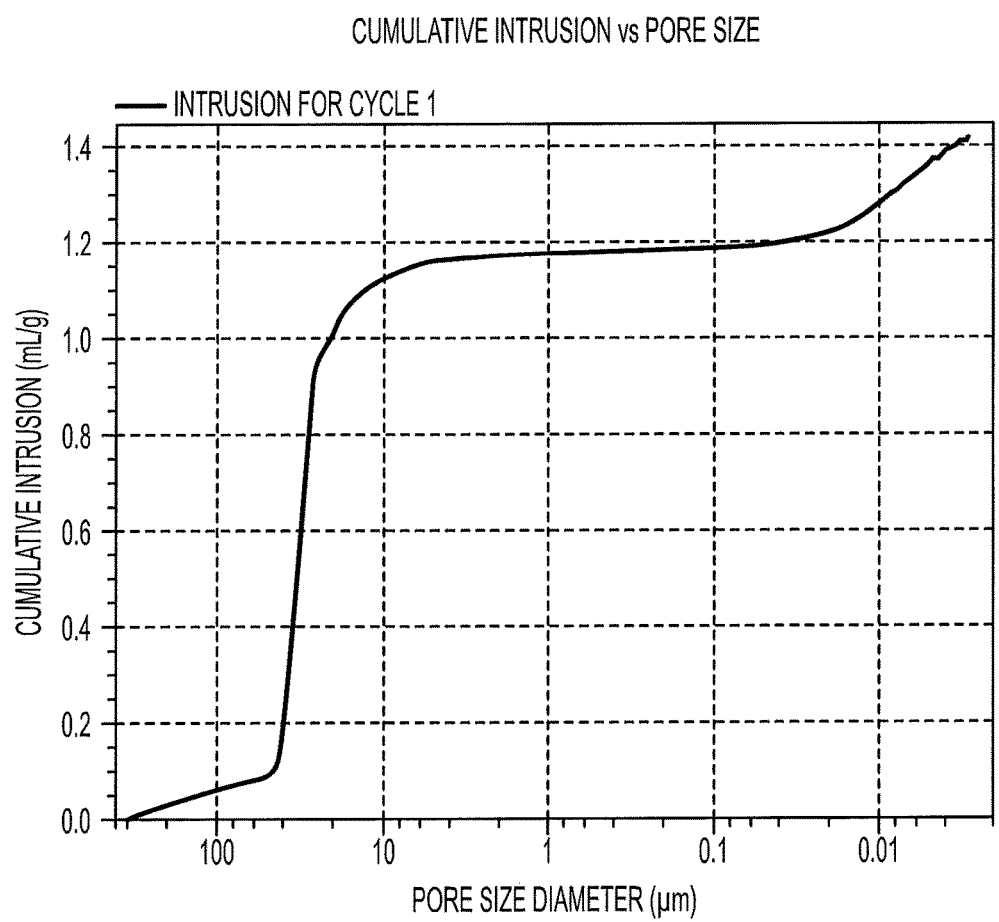
FIG. 9 is a graph of cumulative Hg intrusion vs. pore size for an embodiment of rigid porous purification block disclosed herein.
Figure 10:
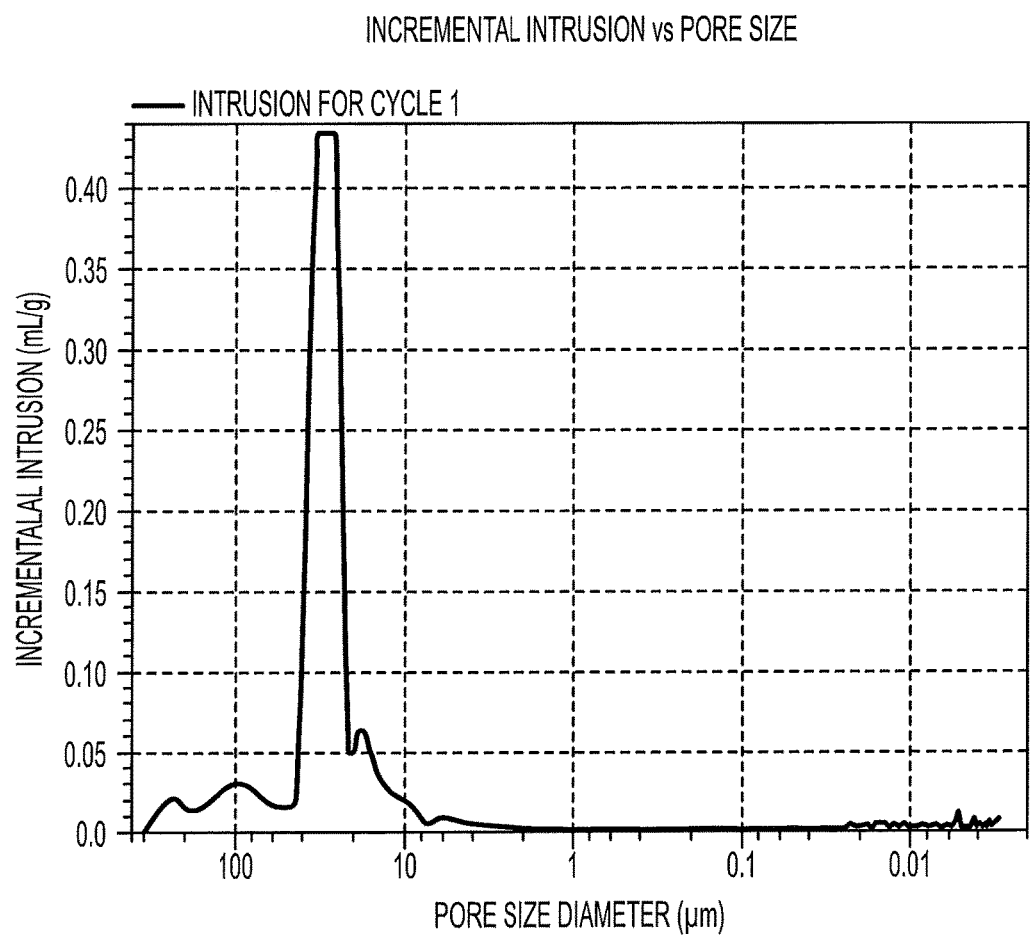
FIG. 10 is a graph of incremental intrusion vs. pore size for the embodiment of FIG. 9.
Figure 11:
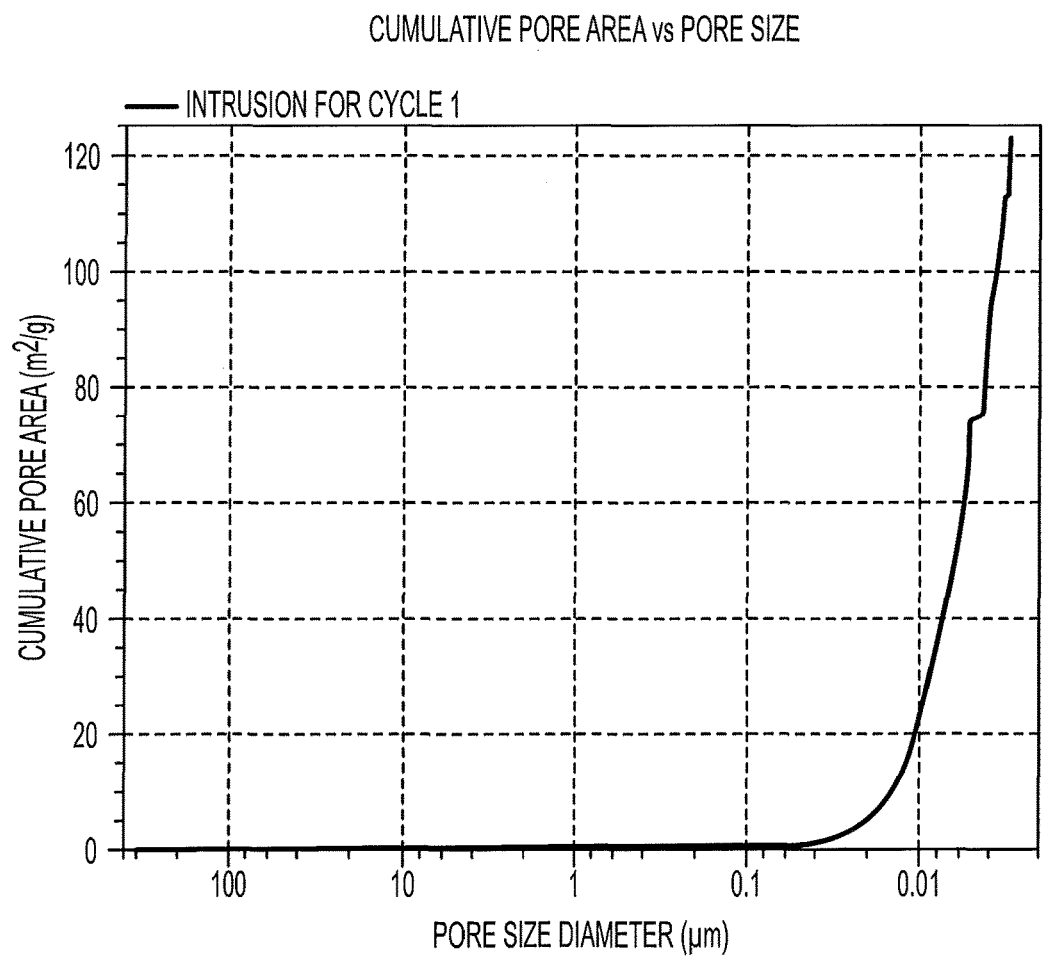
FIG. 11 is a graph of cumulative pore area vs. pore size for the embodiment of FIG. 9.
Figure 12:
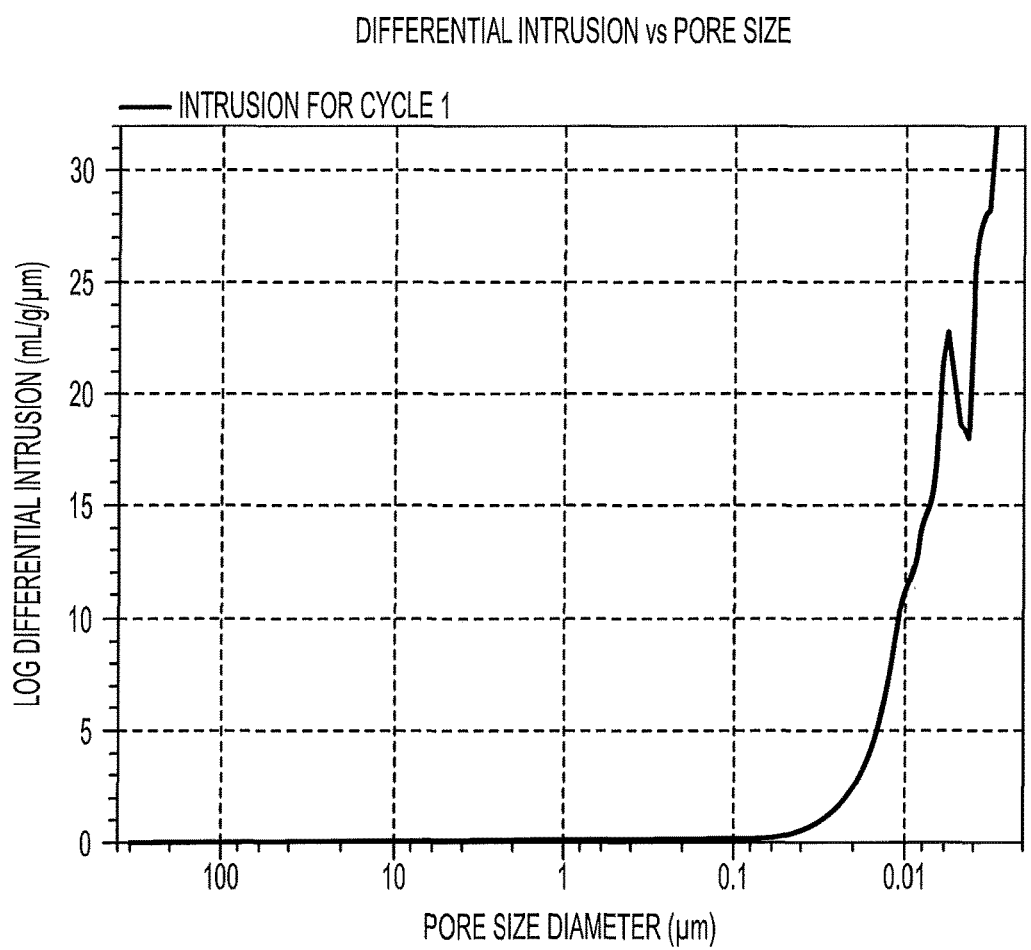
FIG. 12 is a graph of differential intrusion vs. pore size for the embodiment of FIG. 9.
Figure 13:
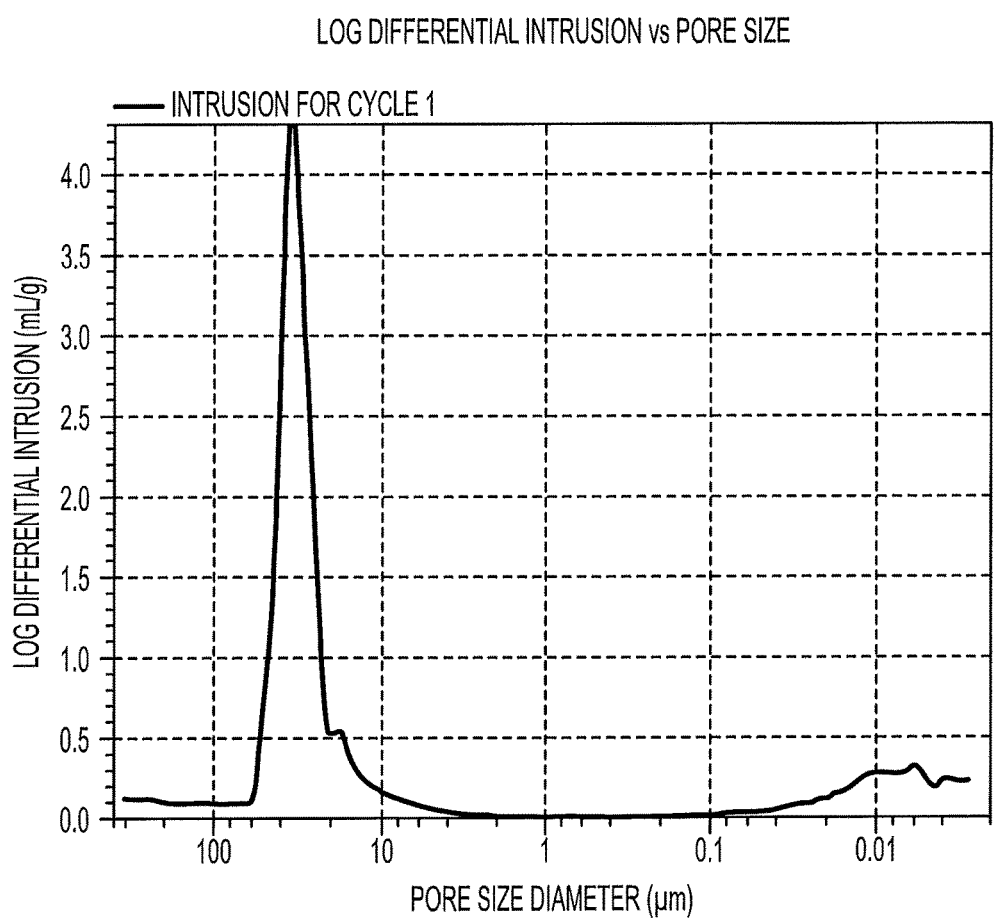
FIG. 13 is a graph of log differential intrusion vs. pore size for the embodiment of FIG. 9.

A micrograph of a suitable material containing 27 wt % porous carbon in porous polymer is given in FIG. 7. A magnified portion of this micrograph is given in FIG. 8.

The porous purification block can then be allowed to cool and removed from the mold. If desired, the outer surface, and in particular, the longitudinal first surface, of the porous purification block can be coated with a layer of porous polymer, such as a HDPE, desirably the same or similar HDPE to that used to make the porous purification block. Desirably, such a coating can have a thickness ranging from $\frac{1}{30}$ to $\frac{1}{40}$ of the thickness of the porous purification block.

Alternatively, the rigid porous purification block can be prepared using only the HDPE, without the inclusion of a fluid purification material dispersed therein. The procedures forming such a block are essentially those described herein, but without the addition of the additional active fluid purification material, such as carbon.

The porous purification block geometry is desirably such that the ratio of the first transverse dimension to the second transverse dimension is between 1.2 and 3.5, more particularly between 1.2 and 2.5, more particularly between 1.2 and 2.3, more particularly between 1.2 and 1.9, more particularly between 1.3 and 1.5, even more particularly between 1.36 and 1.5. For example, using a cylindrical annular geometry as a nonlimiting example, the ratio for a porous purification block having an inside diameter of 0.75 inches and an outside diameter of 1 inch would be 1.33. The ratio for a similar block having an inside diameter of 1.1 inches and an outside diameter of 1.5 inches would be 1.36. The ratio for a similar block having an inside diameter of 3 inches and an outside diameter of 4.5 inches would be 1.5. A suitable length (longitudinal dimension) for a cylindrical annular geometry would be about 6 inches. However, other dimensions for the porous purification block may be used, provided that the ratio of transverse dimensions is within the ranges set forth above. Desirably, a porosity of around 70% extends through the entire thickness of the porous purification block.

The porous purification block described herein can be used alone as the fluid purification media in a fluid purification apparatus by introducing the porous purification block into a suitable housing containing a suitable inlet and outlet manifold that distributes incoming water to be treated (for example) to the first longitudinal surface of the porous purification block. The water flows along this surface and radially inward, where it leaves the porous purification block at the second longitudinal surface. The fluid spaces around these two surfaces should be separated from each other and not be in fluid communication except through the material of the porous purification block, as is known in the art, so that the fluid is forced to pass through the porous purification block by radial flow. Alternatively, if desired, water can be introduced into the annular space inside the second longitudinal surface and forced to flow radially outward through the porous purification block, although this is not the normal commercial configuration.

As disclosed herein, the porous purification block described above can be combined with a second fluid purification media to form a fluid purification system, as described herein, for use in a purification cartridge. For example, the space formed by the inner surface of a tube formed by the porous purification block can contain an oxidizing media. Suitable oxidizing media include aluminosilicates or carbons of a type described above as suitable for inclusion in the porous purification block, may optionally have disposed on surfaces or in pores thereof additional oxidizing materials, such as potassium permanganate, or an iron oxide, such as ferric oxide, Desirably, the particles of the second fluid purification material have particle sizes within the range of 50×200 mesh, and are treated with nitrogen, ammonia, or carbon dioxide, as described above. In a particular embodiment, a molding system can be used to supply steam to a mold to soften and/or partially melt the polymeric material used to form the porous purification block. This same system can then be used to supply the treatment gases described above, either before or after introduction of the second fluid purification material into the central space of the porous purification block. This will activate any active material, such as carbon, etc., within the purification block itself, as well as activate any of the second fluid purification material disposed in the central space of the block at the time of treatment.

A fluid purification system containing the first and second fluid purification media disposed in the form of a cylindrical annulus (formed by the porous purification block) having a central opening containing the second fluid purification material, disposed in a fluid purification cartridge, allows for very fast flow of water through the system, and improves contact time by as much as a factor of 10. A system prepared using 1 gram of second fluid purification media processed 200 gallons of water in accordance with NSF 42 test protocol. A larger scale test shows that 59 grams of second fluid purification media processed 14,000 gallons of challenge water at a flow rate of 0.5 gpm, whereas a similarly sized carbon block filter alone could only process 300 gallons.

A particular rigid porous purification block containing 70% HDPE, 29% porous carbon and 1% zinc oxide was analyzed by Hg intrusion to assess its pore size distribution and other properties. The results are given in Table 2 below, and graphs showing cumulative Hg intrusion, incremental intrusion, cumulative pore area, differential intrusion, and log differential intrusion, each as a function of pore size, are given in FIG. 9 to FIG. 13, respectively.

Alternatively, the rigid porous purification block can be prepared using only the HDPE, without the inclusion of a fluid purification material dispersed therein. The procedures forming such a block are essentially those described herein, but without the addition of the fluid purification material.

TABLE 2

Summary Report
Penetrometer parameters

| | | | |
|---|---|---|---|
| Penetrometer: | 674-(24) 15 Bulb, 3.263 Stem, Solid | | |
| Pen. Constant: | 32.477 μL/pF | Pen. Weight: | 74.9934 g |
| Stem Volume: | 3.2630 mL | Max. Head Pressure: | 4.4500 psia |
| Pen. Volume: | 17.7011 mL | Assembly Weight: | 295.6950 g |

Hg Parameters

| | | | |
|---|---|---|---|
| Adv. Contact Angle: | 130.000 degrees | Rec. Contact Angle: | 130.000 degrees |
| Hg Surface Tension: | 485.000 dynes/cm | Hg Density: | 13.5335 g/mL |

Low Pressure:

| | |
|---|---|
| Evacuation Pressure: | 50 μmHg |
| Evacuation Time: | 5 mins |
| Mercury Filling Pressure: | 0.52 psia |
| Equilibration Time: | 10 secs |

High Pressure:

| | |
|---|---|
| Equilibration Time: | 10 secs |

No Blank Correction
Intrusion Data Summary

| | |
|---|---|
| Total Intrusion Volume = | 1.4145 mL/g |
| Total Pore Area = | 122.459 m²/g |
| Median Pore Diameter (Volume) = | 29.8983 μm |
| Median Pore Diameter (Area) = | 0.0056 μm |
| Average Pore Diameter (4 V/A) = | 0.0462 μm |
| Bulk Density at 0.52 psia = | 0.4373 g/mL |
| Apparent (skeletal) Density = | 1.1467 g/mL |
| Porosity = | 61.8609% |
| Stem Volume Used = | 27% |

Tabular Report

| Pressure (psia) | Pore Diameter (μm) | Cumulative Pore Volume (mL/g) | Incremental Pore Volume (mL/g) | Cumulative Pore Area (m²/g) | Incremental Pore Area (m²/g) |
|---|---|---|---|---|---|
| 0.52 | 345.2103 | 0.0000 | 0.0000 | 0.000 | 0.000 |
| 0.75 | 239.7468 | 0.0209 | 0.0209 | 0.000 | 0.000 |
| 1.00 | 180.6952 | 0.0344 | 0.0135 | 0.001 | 0.000 |
| 2.00 | 90.4928 | 0.0638 | 0.0294 | 0.001 | 0.001 |
| 2.99 | 60.4679 | 0.0796 | 0.0159 | 0.002 | 0.001 |
| 3.99 | 45.3138 | 0.0953 | 0.0157 | 0.003 | 0.001 |
| 5.49 | 32.9469 | 0.5164 | 0.4211 | 0.046 | 0.043 |
| 6.99 | 25.8893 | 0.9506 | 0.4343 | 0.106 | 0.059 |
| 8.48 | 21.3271 | 0.9995 | 0.0488 | 0.114 | 0.008 |
| 10.48 | 17.2563 | 1.0622 | 0.0627 | 0.127 | 0.013 |
| 12.97 | 13.9415 | 1.0956 | 0.0334 | 0.135 | 0.009 |
| 15.96 | 11.3322 | 1.1179 | 0.0223 | 0.142 | 0.007 |
| 19.99 | 9.0458 | 1.1343 | 0.0164 | 0.149 | 0.006 |
| 23.00 | 7.8651 | 1.1420 | 0.0077 | 0.152 | 0.004 |
| 24.99 | 7.2376 | 1.1463 | 0.0043 | 0.155 | 0.002 |

TABLE 2-continued

| | | | | | |
|---|---|---|---|---|---|
| 29.97 | 6.0346 | 1.1546 | 0.0083 | 0.160 | 0.005 |
| 37.19 | 4.8629 | 1.1607 | 0.0061 | 0.164 | 0.004 |
| 46.73 | 3.8703 | 1.1649 | 0.0042 | 0.168 | 0.004 |
| 56.56 | 3.1979 | 1.1674 | 0.0026 | 0.171 | 0.003 |
| 71.56 | 2.5273 | 1.1701 | 0.0026 | 0.175 | 0.004 |
| 86.84 | 2.0827 | 1.1718 | 0.0018 | 0.178 | 0.003 |
| 111.77 | 1.6182 | 1.1732 | 0.0014 | 0.181 | 0.003 |
| 136.32 | 1.3268 | 1.1744 | 0.0012 | 0.184 | 0.003 |
| 172.04 | 1.0513 | 1.1757 | 0.0012 | 0.188 | 0.004 |
| 216.71 | 0.8346 | 1.1766 | 0.0009 | 0.192 | 0.004 |
| 266.17 | 0.6795 | 1.1773 | 0.0008 | 0.196 | 0.004 |
| 326.16 | 0.5545 | 1.1780 | 0.0007 | 0.201 | 0.005 |
| 416.99 | 0.4337 | 1.1790 | 0.0009 | 0.208 | 0.007 |
| 517.43 | 0.3495 | 1.1795 | 0.0005 | 0.213 | 0.005 |
| 636.69 | 0.2841 | 1.1804 | 0.0009 | 0.225 | 0.012 |
| 697.71 | 0.2592 | 1.1807 | 0.0003 | 0.230 | 0.005 |
| 797.38 | 0.2268 | 1.1812 | 0.0005 | 0.238 | 0.008 |
| 988.74 | 0.1829 | 1.1818 | 0.0006 | 0.250 | 0.012 |
| 1196.07 | 0.1512 | 1.1831 | 0.0013 | 0.281 | 0.031 |
| 1297.77 | 0.1394 | 1.1837 | 0.0005 | 0.296 | 0.015 |
| 1394.85 | 0.1297 | 1.1838 | 0.0001 | 0.298 | 0.003 |
| 1496.36 | 0.1209 | 1.1843 | 0.0006 | 0.317 | 0.018 |
| 1595.88 | 0.1133 | 1.1850 | 0.0006 | 0.339 | 0.022 |
| 1697.96 | 0.1065 | 1.1854 | 0.0004 | 0.353 | 0.014 |
| 1895.42 | 0.0954 | 1.1861 | 0.0007 | 0.382 | 0.030 |
| 2043.26 | 0.0885 | 1.1865 | 0.0004 | 0.401 | 0.018 |
| 2194.29 | 0.0824 | 1.1875 | 0.0010 | 0.446 | 0.045 |
| 2345.37 | 0.0771 | 1.1882 | 0.0007 | 0.482 | 0.037 |
| 2493.60 | 0.0725 | 1.1890 | 0.0008 | 0.525 | 0.042 |
| 2643.82 | 0.0684 | 1.1894 | 0.0003 | 0.544 | 0.020 |
| 2693.72 | 0.0671 | 1.1896 | 0.0002 | 0.558 | 0.014 |
| 2843.87 | 0.0636 | 1.1905 | 0.0009 | 0.615 | 0.057 |
| 2993.85 | 0.0604 | 1.1913 | 0.0008 | 0.666 | 0.051 |
| 3241.79 | 0.0558 | 1.1929 | 0.0016 | 0.778 | 0.112 |
| 3492.39 | 0.0518 | 1.1932 | 0.0003 | 0.798 | 0.020 |
| 3741.54 | 0.0483 | 1.1939 | 0.0007 | 0.852 | 0.054 |
| 3991.53 | 0.0453 | 1.1956 | 0.0017 | 0.996 | 0.144 |
| 4240.89 | 0.0426 | 1.1971 | 0.0016 | 1.137 | 0.141 |
| 4485.04 | 0.0403 | 1.1976 | 0.0005 | 1.185 | 0.048 |
| 4725.80 | 0.0383 | 1.1979 | 0.0003 | 1.217 | 0.032 |
| 4984.19 | 0.0363 | 1.1998 | 0.0018 | 1.413 | 0.195 |
| 5282.39 | 0.0342 | 1.2016 | 0.0019 | 1.625 | 0.213 |
| 5481.95 | 0.0330 | 1.2029 | 0.0013 | 1.780 | 0.155 |
| 5729.80 | 0.0316 | 1.2035 | 0.0005 | 1.847 | 0.067 |
| 5982.28 | 0.0302 | 1.2050 | 0.0016 | 2.049 | 0.202 |
| 6229.87 | 0.0290 | 1.2069 | 0.0019 | 2.305 | 0.256 |
| 6481.35 | 0.0279 | 1.2083 | 0.0013 | 2.493 | 0.188 |
| 6729.38 | 0.0269 | 1.2095 | 0.0013 | 2.678 | 0.185 |
| 6978.08 | 0.0259 | 1.2105 | 0.0010 | 2.827 | 0.149 |
| 7474.02 | 0.0242 | 1.2133 | 0.0028 | 3.279 | 0.451 |
| 7974.09 | 0.0227 | 1.2170 | 0.0036 | 3.900 | 0.622 |
| 8473.08 | 0.0213 | 1.2182 | 0.0012 | 4.119 | 0.219 |
| 8973.45 | 0.0202 | 1.2214 | 0.0032 | 4.730 | 0.611 |
| 9269.06 | 0.0195 | 1.2235 | 0.0021 | 5.155 | 0.425 |
| 9568.18 | 0.0189 | 1.2264 | 0.0029 | 5.763 | 0.608 |
| 10019.11 | 0.0181 | 1.2292 | 0.0028 | 6.364 | 0.601 |
| 10470.62 | 0.0173 | 1.2296 | 0.0005 | 6.466 | 0.102 |
| 10971.89 | 0.0165 | 1.2331 | 0.0035 | 7.294 | 0.829 |
| 11472.29 | 0.0158 | 1.2367 | 0.0036 | 8.176 | 0.882 |
| 11970.91 | 0.0151 | 1.2410 | 0.0043 | 9.291 | 1.114 |
| 12570.40 | 0.0144 | 1.2447 | 0.0038 | 10.314 | 1.023 |
| 13070.53 | 0.0138 | 1.2452 | 0.0005 | 10.450 | 0.136 |
| 13617.65 | 0.0133 | 1.2501 | 0.0049 | 11.889 | 1.440 |
| 13967.05 | 0.0129 | 1.2531 | 0.0030 | 12.809 | 0.920 |
| 14307.46 | 0.0126 | 1.2552 | 0.0021 | 13.455 | 0.646 |
| 14564.78 | 0.0124 | 1.2576 | 0.0024 | 14.223 | 0.768 |
| 14965.73 | 0.0121 | 1.2599 | 0.0023 | 14.988 | 0.765 |
| 15416.40 | 0.0117 | 1.2639 | 0.0040 | 16.335 | 1.347 |
| 15762.45 | 0.0115 | 1.2676 | 0.0036 | 17.591 | 1.256 |
| 16166.73 | 0.0112 | 1.2677 | 0.0001 | 17.630 | 0.040 |
| 16616.37 | 0.0109 | 1.2719 | 0.0042 | 19.150 | 1.520 |
| 16960.61 | 0.0107 | 1.2749 | 0.0030 | 20.256 | 1.106 |
| 17316.25 | 0.0104 | 1.2772 | 0.0024 | 21.148 | 0.892 |
| 17658.98 | 0.0102 | 1.2804 | 0.0032 | 22.385 | 1.237 |
| 18064.60 | 0.0100 | 1.2827 | 0.0023 | 23.299 | 0.914 |
| 18414.55 | 0.0098 | 1.2841 | 0.0014 | 23.866 | 0.567 |
| 18763.78 | 0.0096 | 1.2864 | 0.0023 | 24.796 | 0.930 |
| 19163.00 | 0.0094 | 1.2889 | 0.0025 | 25.837 | 1.041 |
| 19768.88 | 0.0091 | 1.2928 | 0.0039 | 27.536 | 1.699 |
| 20268.77 | 0.0089 | 1.2964 | 0.0036 | 29.119 | 1.583 |

TABLE 2-continued

| | | | | | |
|---|---|---|---|---|---|
| 20774.96 | 0.0087 | 1.3011 | 0.0047 | 31.231 | 2.112 |
| 21176.47 | 0.0085 | 1.3028 | 0.0017 | 32.042 | 0.812 |
| 21628.88 | 0.0084 | 1.3031 | 0.0003 | 32.196 | 0.153 |
| 22030.61 | 0.0082 | 1.3036 | 0.0005 | 32.444 | 0.248 |
| 22635.76 | 0.0080 | 1.3073 | 0.0036 | 34.232 | 1.788 |
| 23184.23 | 0.0078 | 1.3104 | 0.0032 | 35.834 | 1.601 |
| 23735.82 | 0.0076 | 1.3136 | 0.0032 | 37.485 | 1.652 |
| 24086.30 | 0.0075 | 1.3157 | 0.0021 | 38.614 | 1.129 |
| 24635.92 | 0.0073 | 1.3192 | 0.0035 | 40.477 | 1.863 |
| 25038.56 | 0.0072 | 1.3203 | 0.0011 | 41.100 | 0.622 |
| 25438.75 | 0.0071 | 1.3222 | 0.0018 | 42.129 | 1.030 |
| 25889.44 | 0.0070 | 1.3257 | 0.0035 | 44.102 | 1.973 |
| 26440.48 | 0.0068 | 1.3294 | 0.0037 | 46.255 | 2.152 |
| 26940.73 | 0.0067 | 1.3301 | 0.0007 | 46.691 | 0.436 |
| 27390.60 | 0.0066 | 1.3307 | 0.0006 | 47.033 | 0.342 |
| 27790.95 | 0.0065 | 1.3311 | 0.0004 | 47.295 | 0.262 |
| 28242.92 | 0.0064 | 1.3332 | 0.0020 | 48.564 | 1.269 |
| 28992.09 | 0.0062 | 1.3355 | 0.0023 | 50.026 | 1.462 |
| 29490.74 | 0.0061 | 1.3400 | 0.0045 | 52.952 | 2.927 |
| 29992.66 | 0.0060 | 1.3413 | 0.0013 | 53.798 | 0.846 |
| 30442.34 | 0.0059 | 1.3424 | 0.0011 | 54.535 | 0.736 |
| 30892.54 | 0.0059 | 1.3453 | 0.0029 | 56.483 | 1.948 |
| 31293.56 | 0.0058 | 1.3471 | 0.0019 | 57.773 | 1.291 |
| 31792.98 | 0.0057 | 1.3489 | 0.0018 | 59.027 | 1.254 |
| 32342.58 | 0.0056 | 1.3522 | 0.0033 | 61.337 | 2.310 |
| 32894.12 | 0.0055 | 1.3539 | 0.0018 | 62.605 | 1.267 |
| 33493.07 | 0.0054 | 1.3579 | 0.0040 | 65.504 | 2.900 |
| 33994.23 | 0.0053 | 1.3688 | 0.0109 | 73.617 | 8.113 |
| 34643.81 | 0.0052 | 1.3688 | 0.0000 | 73.617 | 0.000 |
| 35494.02 | 0.0051 | 1.3688 | 0.0000 | 73.617 | 0.000 |
| 36194.18 | 0.0050 | 1.3688 | 0.0000 | 73.617 | 0.000 |
| 36989.66 | 0.0049 | 1.3698 | 0.0010 | 74.409 | 0.793 |
| 37640.79 | 0.0048 | 1.3698 | 0.0000 | 74.409 | 0.000 |
| 38444.35 | 0.0047 | 1.3698 | 0.0000 | 74.409 | 0.000 |
| 39188.36 | 0.0046 | 1.3698 | 0.0000 | 74.423 | 0.014 |
| 39990.17 | 0.0045 | 1.3698 | 0.0001 | 74.469 | 0.047 |
| 40487.10 | 0.0045 | 1.3699 | 0.0001 | 74.528 | 0.059 |
| 40992.49 | 0.0044 | 1.3717 | 0.0018 | 76.191 | 1.663 |
| 42479.49 | 0.0043 | 1.3794 | 0.0077 | 83.312 | 7.121 |
| 43333.89 | 0.0042 | 1.3812 | 0.0018 | 84.987 | 1.675 |
| 43969.05 | 0.0041 | 1.3843 | 0.0031 | 88.013 | 3.027 |
| 44978.84 | 0.0040 | 1.3868 | 0.0025 | 90.425 | 2.411 |
| 46471.49 | 0.0039 | 1.3908 | 0.0040 | 94.492 | 4.067 |
| 47963.72 | 0.0038 | 1.3944 | 0.0035 | 98.174 | 3.683 |
| 49463.29 | 0.0037 | 1.3966 | 0.0022 | 100.551 | 2.377 |
| 50163.30 | 0.0036 | 1.3966 | 0.0000 | 100.551 | 0.000 |
| 52960.51 | 0.0034 | 1.4019 | 0.0053 | 106.631 | 6.079 |
| 54462.78 | 0.0033 | 1.4066 | 0.0047 | 112.167 | 5.537 |
| 55961.25 | 0.0032 | 1.4069 | 0.0003 | 112.540 | 0.372 |
| 57963.79 | 0.0031 | 1.4069 | 0.0000 | 112.540 | 0.000 |
| 59960.48 | 0.0030 | 1.4145 | 0.0076 | 122.459 | 9.919 |

The porous purification block geometry is desirably such that the ratio of the first transverse dimension to the second transverse dimension is between 1.2 and 3.5, more particularly between 1.2 and 2.5, more particularly between 1.2 and 2.3, more particularly between 1.2 and 1.9, more particularly between 1.3 and 1.5, even more particularly between 1.36 and 1.5. For example, using a cylindrical annular geometry as a nonlimiting example, the ratio for a porous purification block having an inside diameter of 0.75 inches and an outside diameter of 1 inch would be 1.33. The ratio for a similar block having an inside diameter of 1.1 inches and an outside diameter of 1.5 inches would be 1.36. The ratio for a similar block having an inside diameter of 3 inches and an outside diameter of 4.5 inches would be 1.5. A suitable length (longitudinal dimension) for a cylindrical annular geometry would be about 6 inches. However, other dimensions for the porous purification block may be used, provided that the ratio of transverse dimensions is within the ranges set forth above.

The porous purification block described herein can be used alone as the fluid purification media in a fluid purification apparatus by introducing the porous purification block into a suitable housing containing a suitable inlet and outlet manifold that distributes incoming water to be treated (for example) to the first longitudinal surface of the porous purification block. The water flows along this surface and radially inward, where it leaves the porous purification block at the second longitudinal surface. The fluid spaces around these two surfaces should be separated from each other and not be in fluid communication except through the material of the porous purification block, as is known in the art, so that the fluid is forced to pass through the porous purification block by radial flow. Alternatively, if desired, water can be introduced into the annular space inside the second longitudinal surface and forced to flow radially outward through the porous purification block, although this is not the normal commercial configuration.

What is claimed is:
1. A fluid purification system, comprising:
 a first fluid purification media comprising a first rigid porous purification block having an average pore diameter that ranges between 2,000 and 60,000 Å, comprising:

a longitudinal first surface;
a longitudinal second surface disposed inside the longitudinal first surface;
wherein the longitudinal first surface is an outer surface having a first transverse dimension, the longitudinal second surface is an inner surface having a second transverse dimension, the ratio of the first transverse dimension to the second transverse dimension is in the range of 1.2 to 1.9, and the difference between the first transverse dimension and the second transverse dimension is the thickness of the first rigid porous purification block; and
a porous high density polymer disposed between the longitudinal first surface and the longitudinal second surface and forming a thickness therebetween;
wherein the porous high density polymer comprises a void volume of 30-70 volume %;
a second fluid purification media, comprising a fluid purification material disposed adjacent to the first surface of the first fluid purification media, the second surface of the first purification media, or both;
wherein the second fluid purification media is disposed in a fluid path after said first fluid purification media to purify fluid exiting the first fluid purification media; and
wherein the first rigid porous purification block comprises carbon particles having a porosity of 50% to 90% and an average particle size ranging from 5 to 200 microns.

2. The fluid purification system according to claim 1, further comprising:
a third fluid purification media comprising a second rigid porous purification block having a longitudinal outer surface and a longitudinal inner surface, wherein the longitudinal inner surface is disposed transversely outside the longitudinal first surface of the first fluid purification media and defining a transverse gap therebetween, or wherein the longitudinal outer surface is disposed inside the longitudinal second surface of the first fluid purification media, and defining a transverse gap therebetween.

3. The fluid purification system according to claim 2, wherein the second purification media is disposed in the transverse gap.

4. The fluid purification system of claim 3, wherein the longitudinal outer surface of the second rigid porous purification block of the third fluid purification media is disposed transversely inside the longitudinal second surface of the first rigid porous purification block of the first fluid purification media, and wherein the second fluid purification media is disposed in the transverse gap between said longitudinal second surface and said longitudinal outer surface.

5. The fluid purification system of claim 1, wherein:
the ratio of the first transverse dimension to the second transverse dimension is in the range of 1.3 to 1.5.

6. The fluid purification system of claim 5, wherein:
the ratio of the first transverse dimension to the second transverse dimension is in the range of 1.36 to 1.5.

7. The fluid purification system of claim 1, wherein the first rigid porous purification block is in the form of an cylindrical annulus, and wherein the first transverse dimension is an outer diameter of the cylindrical annulus and the second transverse dimension is an inner diameter of the cylindrical annulus.

8. The fluid purification system of claim 1, wherein the porous high density polymer comprises a high density polyethylene (HDPE).

9. The fluid purification system of claim 1, wherein the porous high density polymer comprises polyethylene.

10. The fluid purification system of claim 8, wherein the porous high density polymer is blow molded.

11. The fluid purification system of claim 1, wherein the porous high density polymer has a void volume of 40%.

12. The fluid purification system of claim 1, wherein the porous high density polymer comprises ultra high molecular weight polyethylene.

13. The fluid purification system of claim 1, wherein the first rigid porous purification block comprises polymeric materials having a micron rating of 1-150.

14. The fluid purification system of claim 1, wherein the porous high density polymer is formed from particles of high density polymer having an average particle size ranging between 10 and 50 µm.

15. The fluid purification system of claim 1, wherein the first fluid purification media comprises a fluid purification material present in an amount ranging between 15 and 30% by weight, based on the total weight of the first rigid porous purification block.

16. The fluid purification system of claim 1, wherein the porous high density polymer is present in an amount ranging between 65 and 90% by weight, based on the total weight of the first rigid porous purification block.

17. The fluid purification system of claim 1, wherein the porous high density polymer is present in an amount ranging between 70 and 90% by weight, based on the total weight of the first rigid porous purification block.

18. The fluid purification system of claim 1, wherein the first rigid porous purification block comprises nanoparticulate metal oxide selected from the group consisting of nanoparticulate zinc oxide and nanoparticulate titanium oxide, optionally in a silica matrix.

19. The fluid purification system of claim 18, wherein the nanoparticulate metal oxide is present in an amount ranging between 5 and 10% by weight, based upon the total weight of the first rigid porous purification block.

20. The fluid purification system of claim 18, wherein the nanoparticulate zinc oxide is present in an amount of about 7% by weight, based upon the total weight of the first rigid porous purification block.

21. The fluid purification system of claim 1, wherein the first rigid porous purification block further comprises alumina nanofibers.

22. The fluid purification system of claim 21, wherein said alumina nanofibers are present in amounts ranging between 2 and 3% by weight, based upon the total weight of the first rigid porous purification block.

23. The fluid purification system of claim 1, wherein the first rigid porous purification block comprises 100% porous material polymer.

24. The fluid purification system of claim 1, further comprising:
a coating on the longitudinal first surface of the first rigid porous purification block, comprising a high density polymer.

25. The fluid purification system of claim 24, wherein said coating has a thickness that is 1/40 to 1/30 of the thickness of the first rigid porous purification block.

26. The fluid purification system of claim 25, wherein the coating comprises high density polyethylene.

27. The fluid purification system of claim 1, wherein the carbon particles have an average particle size in the range of 10-200 µm.

28. The fluid purification system of claim 1, wherein the carbon particles have a size distribution such that 5-25% by weight of the particles are smaller than 325 mesh and 7% by weight of the carbon particles are larger than 80 mesh.

29. The fluid purification system of claim 1, wherein the carbon particles are obtained by reacting wood-based carbon with acid under pressure, to obtain acid-reacted carbon, and heating the acid-reacted carbon in a gas atmosphere at around 780° C. for 10-16 hours.

30. The fluid purification system of claim 1, wherein the carbon particles have a size distribution such that 5-25% by weight of the particles are smaller than 325 mesh and 7% by weight of the particles are larger than 80 mesh; and carbon particles that are obtained by reacting wood-based carbon with acid under pressure, to obtain acid-reacted carbon, and heating the acid-reacted carbon in a gas atmosphere.

31. The fluid purification system according to claim 1, wherein the second fluid purification media comprises an aluminosilicate.

32. A fluid purification apparatus comprising the fluid purification system of claim 1.

33. A method of purifying water, comprising contacting the water with the fluid purification system of claim 1 at a pressure of 7-10 psi.

34. The method of claim 33, which comprises reducing a bacteria content of the water by 99.99% using a flow rate of at least 1000 cm$^3$ per minute with an inlet pressure of 10 psi.

35. A method of purifying water in water processing equipment, comprising contacting water with the fluid purification system of claim 1 prior to or during contact of the water with said water processing equipment.

36. The method of claim 35, wherein said water processing equipment comprises a heat exchanger.

37. An appliance comprising:
an input water line; and
a fluid purification system according to claim 1 disposed in said input waterline.

38. The appliance of claim 37, wherein the appliance is a refrigerator, an ice maker, an automatic dishwasher, or a laundry washer.

39. A fluid purification system, comprising:
a first fluid purification media comprising a first rigid porous purification block having an average pore diameter that ranges between 2,000 and 60,000 Å, and comprising:
a longitudinal first surface;
a longitudinal second surface disposed inside the longitudinal first surface;
a porous high density polymer having a void volume of 30-70 volume % disposed between the longitudinal first surface and the longitudinal second surface; and
carbon particles having a porosity of 50 to 90% and an average particle size ranging from 5 to 200 microns;
a second fluid purification media, comprising a particulate oxidizing material disposed adjacent to the first surface of the first fluid purification media, the second surface of the first purification media, or both wherein:
the longitudinal first surface has a first transverse dimension;
the longitudinal second surface is an inner surface having a second transverse dimension; and
the ratio of the first transverse dimension to the second transverse dimension is in the range of 1.2 to 3.5,
wherein the second fluid purification media is disposed in a fluid path after said first fluid purification media to purify fluid exiting the first fluid purification media; and the difference between the first transverse dimension and the second transverse dimension is the thickness of the porous purification block.

40. The fluid purification system of claim 39, wherein the ratio is in the range of 1.2 to 2.5.

41. The fluid purification system of claim 40, wherein the ratio is in the range of 1.2 to 2.3.

42. A method of purifying water comprising the fluid purification system of claim 39.

43. A fluid purification system, comprising:
a first fluid purification media comprising a first rigid purification block having an average pore diameter that ranges between 2,000 and 60,000 Å, comprising:
a longitudinal first surface;
a longitudinal second surface disposed inside the longitudinal first surface;
wherein the longitudinal first surface is an outer surface having a first transverse dimension, the longitudinal second surface is an inner surface having a second transverse dimension, the ratio of the first transverse dimension to the second transverse dimension is in the range of 1.2 to 1.9, and the difference between the first transverse dimension and the second transverse dimension is the thickness of the first rigid porous purification block; and
a porous high density polymer comprising a void volume of 30-70 volume % disposed between the longitudinal first surface and the longitudinal second surface, wherein the longitudinal first surface and the longitudinal second surface each have openings therein of sufficient size to permit water to flow through the first rigid purification block; and
carbon particles having a porosity of 50% to 90% and an average particle size ranging from 5 to 200 microns disposed within the porous high density polymer;
a second fluid purification media, comprising a particulate oxidizing material disposed on surfaces in pores of a carrier material, disposed inside the first longitudinal surface of the first fluid purification media, the second longitudinal surface of the first purification media, or both;
wherein the second fluid purification media is disposed in a fluid path after said first fluid purification media to purify fluid exiting the first fluid purification media; and
a third fluid purification media comprising a second rigid porous purification block having a longitudinal outer surface and a longitudinal inner surface, wherein the longitudinal inner surface is disposed transversely outside the longitudinal first surface of the first fluid purification media and defining a transverse gap therebetween, or wherein the longitudinal outer surface is disposed inside the longitudinal second surface of the first fluid purification media, and defining a transverse gap therebetween.

44. The fluid purification system of claim 1, wherein the carbon particles have an average particle size in the range of 5-60 μm.

45. The fluid purification system of claim 1, wherein the first rigid porous purification block comprises polymeric materials having a micron rating of 1-20.

* * * * *